US012686117B2

(12) United States Patent (10) Patent No.: US 12,686,117 B2
Huang et al. (45) Date of Patent: Jul. 21, 2026

(54) CONTROL METHOD OF MECHANICAL ARM, MECHANICAL ARM ASSEMBLY, AND STORAGE MEDIUM

(71) Applicant: NOAHTRON INTELLIGENCE MEDTECH (HANGZHOU) CO., LTD., Hangzhou (CN)

(72) Inventors: Shandeng Huang, Hangzhou (CN); Long Bai, Hangzhou (CN); Xiaohong Chen, Hangzhou (CN); Lufeng Pan, Hangzhou (CN)

(73) Assignee: NOAHTRON INTELLIGENCE MEDTECH (HANGZHOU) CO., LTD., Hangzhou (CN)

(*) Notice: Subject to any disclaimer, the term of this patent is extended or adjusted under 35 U.S.C. 154(b) by 139 days.

(21) Appl. No.: 18/535,498

(22) Filed: Dec. 11, 2023

(65) Prior Publication Data

US 2024/0123609 A1 Apr. 18, 2024

Related U.S. Application Data

(63) Continuation of application No. PCT/CN2022/098189, filed on Jun. 10, 2022.

(30) Foreign Application Priority Data

Jun. 11, 2021 (CN) .......................... 202110682456.0

(51) Int. Cl.
*B25J 9/16* (2006.01)
*B25J 9/06* (2006.01)

(52) U.S. Cl.
CPC ........... *B25J 9/1602* (2013.01); *B25J 9/1664* (2013.01); *B25J 9/06* (2013.01); *B25J 9/162* (2013.01)

(58) Field of Classification Search
CPC . B25J 9/1602; B25J 9/1664; B25J 9/06; B25J 9/162; B25J 9/1607; B25J 9/1623;
(Continued)

(56) References Cited

U.S. PATENT DOCUMENTS 10,874,469 B2 * 12/2020 Zheng .................. A61B 17/808
2007/0173977 A1 7/2007 Schena
(Continued)

FOREIGN PATENT DOCUMENTS

CN 101038219 A 9/2007
CN 104390612 A 3/2015
(Continued)

OTHER PUBLICATIONS

"Examination Report for Indian Application No. 202317089944", Apr. 20, 2026, Intellectual Property India, Government of India.

*Primary Examiner* — Kira Nguyen
(74) *Attorney, Agent, or Firm* — Bridgeway IP Law Group, PLLC; Sang Ho Lee; Hyun Woo Shin

(57) ABSTRACT

A control method of a mechanical arm, a mechanical arm assembly, and a readable storage medium. The mechanical arm includes a parallel platform which includes a movable platform, a static platform and a telescopic element connecting the movable platform and the static platform, and the method includes: acquiring a current pose of the movable platform in a mechanical coordinate system, wherein the mechanical coordinate system is a global coordinate system of the mechanical arm where the movable platform is located; acquiring, according to the current pose of the movable platform, a target pose of a static platform in the mechanical coordinate system; performing pose transformation on the static platform according to the current pose of the movable platform and the target pose of the static platform.

19 Claims, 10 Drawing Sheets

(58) Field of Classification Search
CPC .......... B25J 9/003; B25J 17/02; B25J 18/025;
A61B 34/30; A61B 34/37; A61B 34/70;
A61B 2034/2059; A61B 34/20
USPC ........................................................ 700/262
See application file for complete search history.

(56) References Cited

U.S. PATENT DOCUMENTS

| | | | | |
|---|---|---|---|---|
| 2008/0046122 A1* | 2/2008 | Manzo | ................... | A61B 90/98 |
| | | | | 700/245 |
| 2011/0319913 A1* | 12/2011 | Labadie | ................. | A61B 90/11 |
| | | | | 606/130 |
| 2016/0354162 A1* | 12/2016 | Yen | ......................... | A61B 34/20 |
| 2019/0125461 A1 | 5/2019 | Zheng et al. | | |
| 2019/0142396 A1 | 5/2019 | Stoianovici et al. | | |
| 2019/0357985 A1* | 11/2019 | Abedin-Nasab | ....... | A61B 34/10 |

FOREIGN PATENT DOCUMENTS

| | | | |
|---|---|---|---|
| CN | 104959975 | A | 10/2015 |
| CN | 105807712 | A | 7/2016 |
| CN | 106112980 | A | 11/2016 |
| CN | 108015750 | A | 5/2018 |
| CN | 108113755 | A | 6/2018 |
| CN | 108247636 | A | 7/2018 |
| CN | 108267979 | A | 7/2018 |
| CN | 109669482 | A | 4/2019 |
| CN | 110142762 | A | 8/2019 |
| CN | 110464471 | A | 11/2019 |
| CN | 110815180 | A | 2/2020 |
| CN | 111227943 | A | 6/2020 |
| CN | 112754616 | A | 5/2021 |
| CN | 112828885 | A | 5/2021 |
| CN | 112894802 | A | 6/2021 |
| CN | 113334390 | A | 9/2021 |
| CN | 113545851 | A | 10/2021 |

* cited by examiner

S110

Acquire a current pose of a movable platform in a mechanical coordinate system after reconstruction of the surgical field center of an instrument, wherein the mechanical coordinate system is a global coordinate system of a mechanical arm where the movable platform is located

S120

Acquire, according to the current pose of the movable platform, a target pose of a static platform in the mechanical coordinate system after the reconstruction of the surgical field center of an instrument, wherein the movable platform and the static platform form a parallel platform, in the mechanical arm, connected by means of a telescopic element, the center of the target pose of the static platform is located on a central axis of the current pose of the movable platform, and the static platform in the target pose is parallel to the movable platform

S130

Perform pose transformation on the static platform according to the current pose of the movable platform and the target pose of the static platform

S140

Acquire an angle of twist between the movable platform and the static platform on a central axis according to the current pose of the movable platform and the target pose of the static platform; and perform rotation transformation on the movable platform according to the angle of twist to return a parallel platform to a zero position

FIG. 1

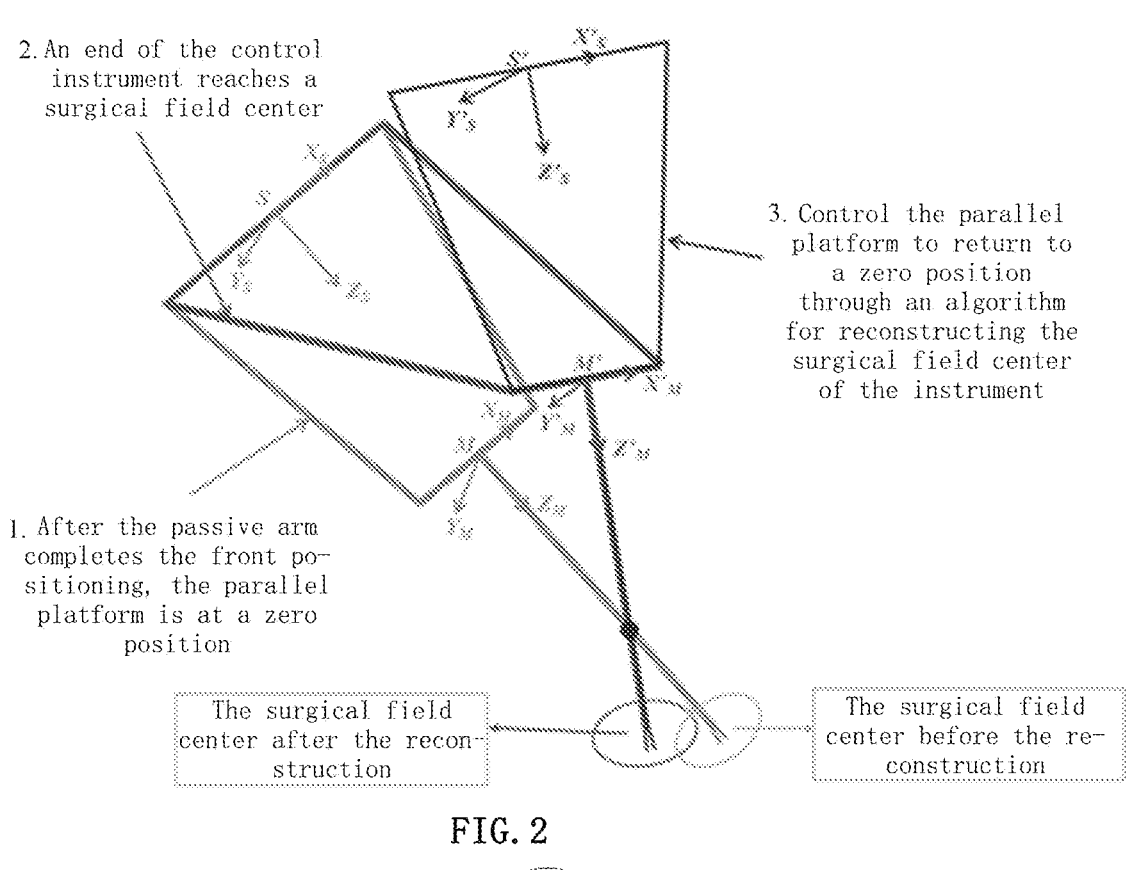

2. An end of the control instrument reaches a surgical field center

3. Control the parallel platform to return to a zero position through an algorithm for reconstructing the surgical field center of the instrument 1. After the passive arm completes the front positioning, the parallel platform is at a zero position The surgical field center after the reconstruction The surgical field center before the reconstruction

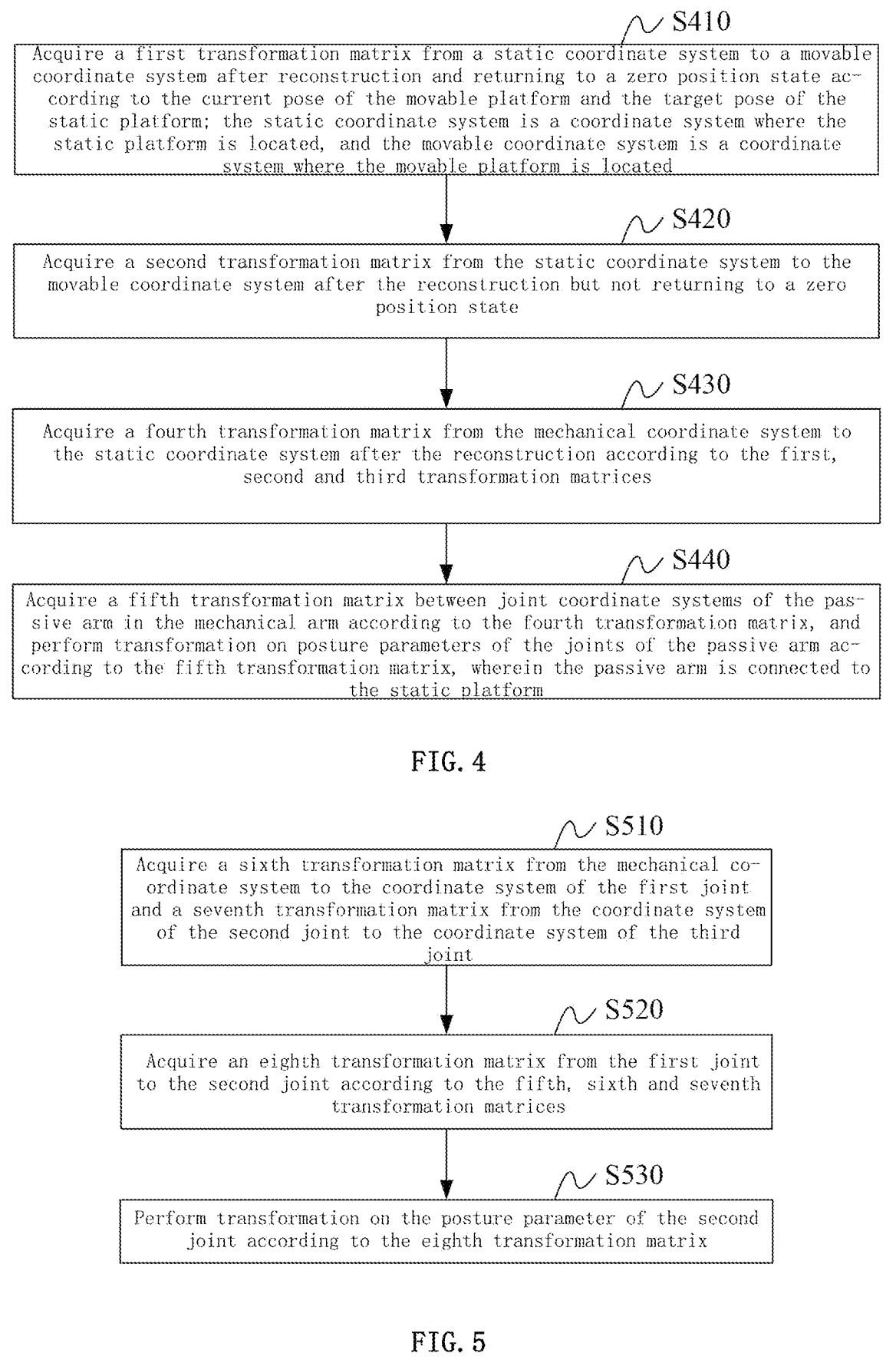

Acquire a first transformation matrix from a static coordinate system to a movable coordinate system after reconstruction and returning to a zero position state according to the current pose of the movable platform and the target pose of the static platform; the static coordinate system is a coordinate system where the static platform is located, and the movable coordinate system is a coordinate system where the movable platform is located

S420

Acquire a second transformation matrix from the static coordinate system to the movable coordinate system after the reconstruction but not returning to a zero position state

S430

Acquire a fourth transformation matrix from the mechanical coordinate system to the static coordinate system after the reconstruction according to the first, second and third transformation matrices

S440

Acquire a fifth transformation matrix between joint coordinate systems of the passive arm in the mechanical arm according to the fourth transformation matrix, and perform transformation on posture parameters of the joints of the passive arm according to the fifth transformation matrix, wherein the passive arm is connected to the static platform

Acquire a sixth transformation matrix from the mechanical coordinate system to the coordinate system of the first joint and a seventh transformation matrix from the coordinate system of the second joint to the coordinate system of the third joint

S520

Acquire an eighth transformation matrix from the first joint to the second joint according to the fifth, sixth and seventh transformation matrices

S530

Perform transformation on the posture parameter of the second joint according to the eighth transformation matrix

FIG. 5

S510

Acquire a sixth transformation matrix from the mechanical coordinate system to the coordinate system of the first joint and a seventh transformation matrix from the coordinate system of the second joint to the coordinate system of the third joint

S520

Acquire an eighth transformation matrix from the first joint to the second joint according to the fifth, sixth and seventh transformation matrices

S610

Acquire a driving parameter transformation relationship from the first joint to the third revolve pair, and solve to obtain driving parameters of the first revolve pair, the first translation pair, the second revolve pair, the second translation pair, and the third revolve pair according to the eighth transformation matrix and the driving parameter transformation relationship

FIG. 6

S110

Acquire a current pose of a movable platform in a mechanical coordinate system after reconstruction of the surgical field center of an instrument, wherein the mechanical coordinate system is a global coordinate system of a mechanical arm where the movable platform is located

S120 acquire, according to the current pose of the movable platform, a target pose of a static platform in the mechanical coordinate system after the reconstruction of the surgical field center of an instrument, wherein the movable platform and the static platform form a parallel platform, in the mechanical arm, connected by means of a telescopic element, the center of the target pose of the static platform is located on a central axis of the current pose of the movable platform, and the static platform in the target pose is parallel to the movable platform

S710 acquire a first telescopic amount of the telescopic element according to the current pose of the movable platform and the target pose of the static platform, and when performing pose transformation on the static platform, adjust the telescopic element according to the first telescopic amount to make the current pose of the movable platform in the mechanical coordinate system remain unchanged

FIG. 7

S810

Acquire the original pose of the static platform before reconstruction, interpolate the original pose and the target pose of the static platform, and acquire the intermediate pose of the static platform during the pose transformation process

S820

Perform position transformation and posture transformation on the static platform according to the intermediate pose and the current pose of the movable platform, wherein the position transformation includes a circular arc motion transformation with a telecentric fixed point as the center of a circle and a linear motion transformation pointing towards the center of a circle, and the posture transformation includes rotation transformation of the static coordinate system around the Z axis of the mechanical coordinate system and rotation transformation of the static coordinate system around its own Y axis

FIG. 8

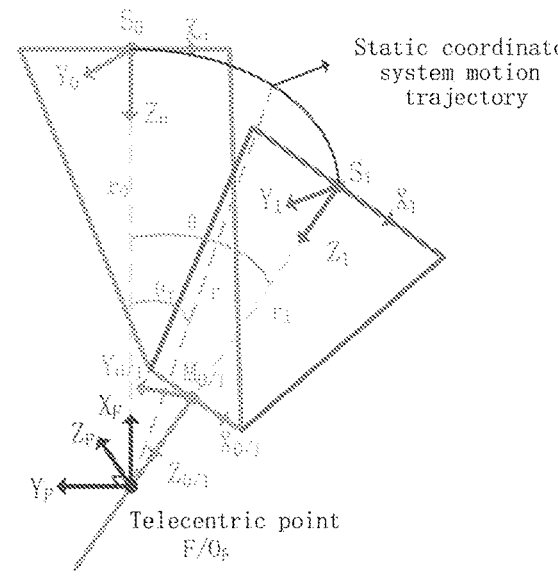

Static coordinate
system motion
trajectory

Telecentric point
F/O$_F$

FIG. 9

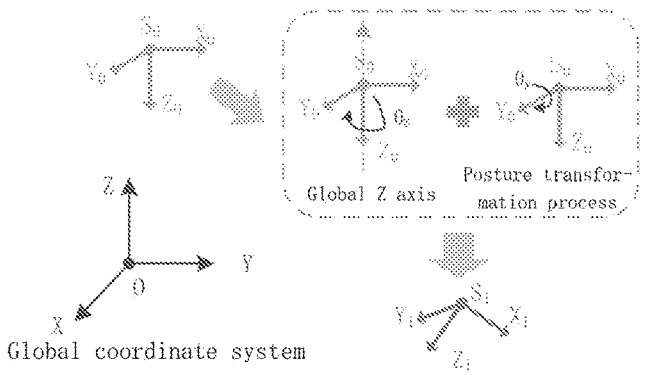

Global Z axis

Posture transfor-
mation process

Global coordinate system

Transform the intermediate pose into the ninth transformation
matrix from the static coordinate system to the mechanical coordi-
nate system and the tenth transformation matrix from the static co-
ordinate system to the movable coordinate system: the static coor-
dinate system is a coordinate system where the static platform is
located, and the movable coordinate system is a coordinate system
where the movable platform is located

S1120

Perform transformation on the posture parameter of the joint of
the passive arm according to the ninth transformation matrix and
the tenth transformation matrix, wherein the passive arm is con-
nected to the static platform

S1130

Acquire a second telescopic amount of the telescopic element ac-
cording to the ninth transformation matrix and the tenth transfor-
mation matrix, and adjust the telescopic element according to the
second telescopic amount to make the current pose of the movable
platform in the mechanical coordinate system remain unchanged

FIG. 11

End point $T$

Telecentric point $F'$ $F_1$

Instrument $F_2$ $l_h$ $l_j$ $l$ $Z_M$ $Z_M$ Movable
platform

Electric propulsion
cylinder

Driving rod position
at a certain time $X_M$ $M_4$ $M_5$ $M_3$ $r_M$ $O_M$ $Y_M$ $M_2$ $M_1$ $M_6$ $X_M$ $Z_S$ $Z_S$ $S_5$ $r_S$ $O_S$ $Y_S$ Static
platform $X_S$ $X_S$ $Y_S$ (a) Axis view of stewart platform $T$ $F$ $(0,0,h+l-lh)$ $Z_M$ $M_4$ $h+l-lh$ $Y_M$ $O_M$ $l_4$ $Z_S$ $h$ $Y_S$ $O_S$ $S_4$ (b) Front view of stewart platform $S_3$ $S_2$ $O_S$ $\alpha$ $\beta$ $120°$ $120°$ $\theta$ $S_4$ $Y_M$ $Y_S$ $X_M$ $X_S$ $S_5$ $S_6$ $S_1$ (c) Vertical view of stewart platform

FIG. 12

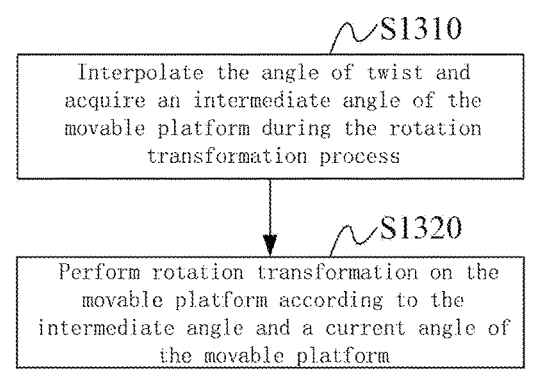

S1310

Interpolate the angle of twist and
acquire an intermediate angle of the
movable platform during the rotation
transformation process

S1320

Perform rotation transformation on the
movable platform according to the
intermediate angle and a current angle of
the movable platform

Figures 14, 15:
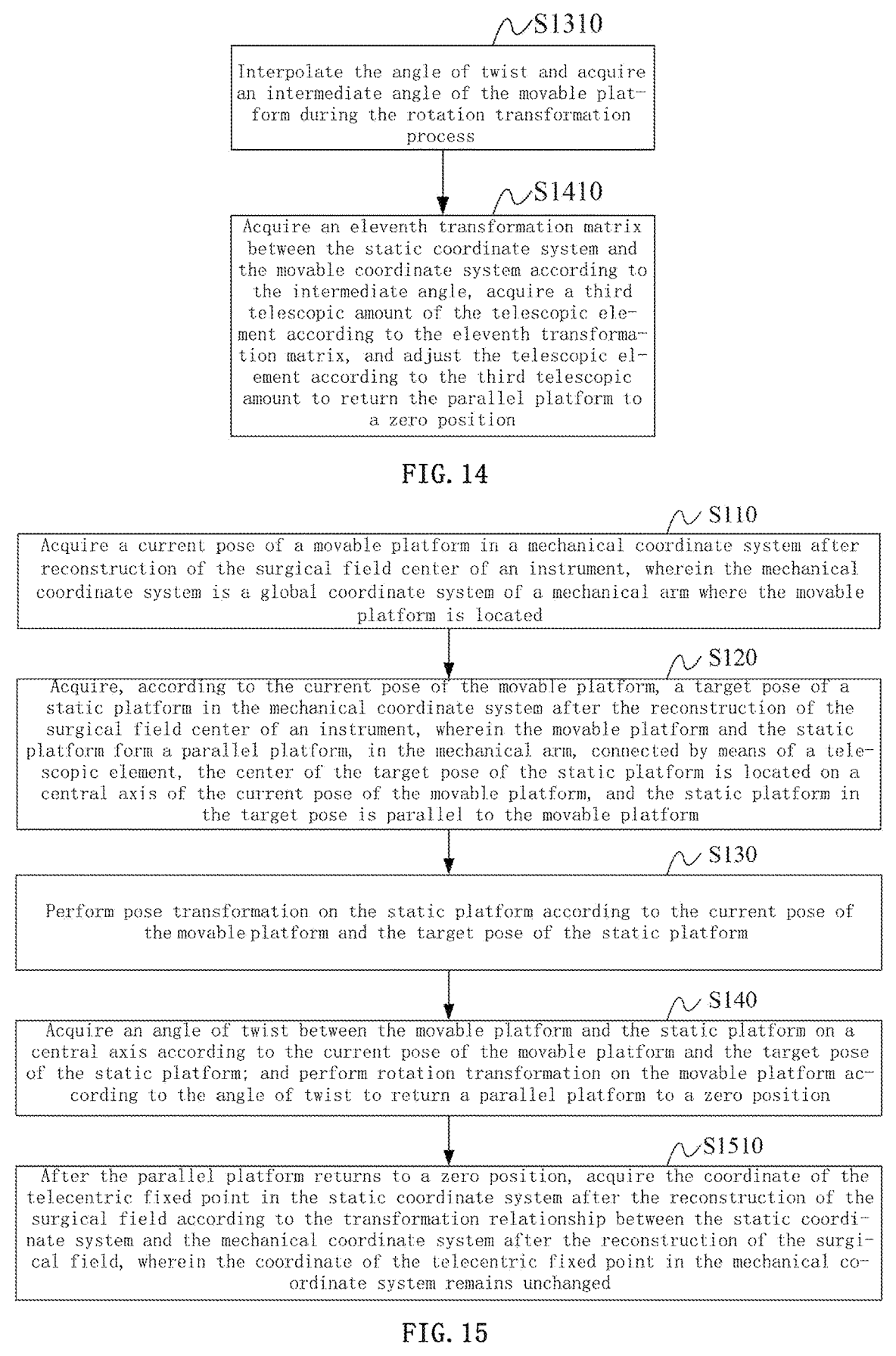

Interpolate the angle of twist and acquire an intermediate angle of the movable platform during the rotation transformation process

S1410

Acquire an eleventh transformation matrix between the static coordinate system and the movable coordinate system according to the intermediate angle, acquire a third telescopic amount of the telescopic element according to the eleventh transformation matrix, and adjust the telescopic element according to the third telescopic amount to return the parallel platform to a zero position

Acquire a current pose of a movable platform in a mechanical coordinate system after reconstruction of the surgical field center of an instrument, wherein the mechanical coordinate system is a global coordinate system of a mechanical arm where the movable platform is located

S120

Acquire, according to the current pose of the movable platform, a target pose of a static platform in the mechanical coordinate system after the reconstruction of the surgical field center of an instrument, wherein the movable platform and the static platform form a parallel platform, in the mechanical arm, connected by means of a telescopic element, the center of the target pose of the static platform is located on a central axis of the current pose of the movable platform, and the static platform in the target pose is parallel to the movable platform

S130

Perform pose transformation on the static platform according to the current pose of the movable platform and the target pose of the static platform

S140

Acquire an angle of twist between the movable platform and the static platform on a central axis according to the current pose of the movable platform and the target pose of the static platform; and perform rotation transformation on the movable platform according to the angle of twist to return a parallel platform to a zero position

S1510

After the parallel platform returns to a zero position, acquire the coordinate of the telecentric fixed point in the static coordinate system after the reconstruction of the surgical field according to the transformation relationship between the static coordinate system and the mechanical coordinate system after the reconstruction of the surgical field, wherein the coordinate of the telecentric fixed point in the mechanical coordinate system remains unchanged

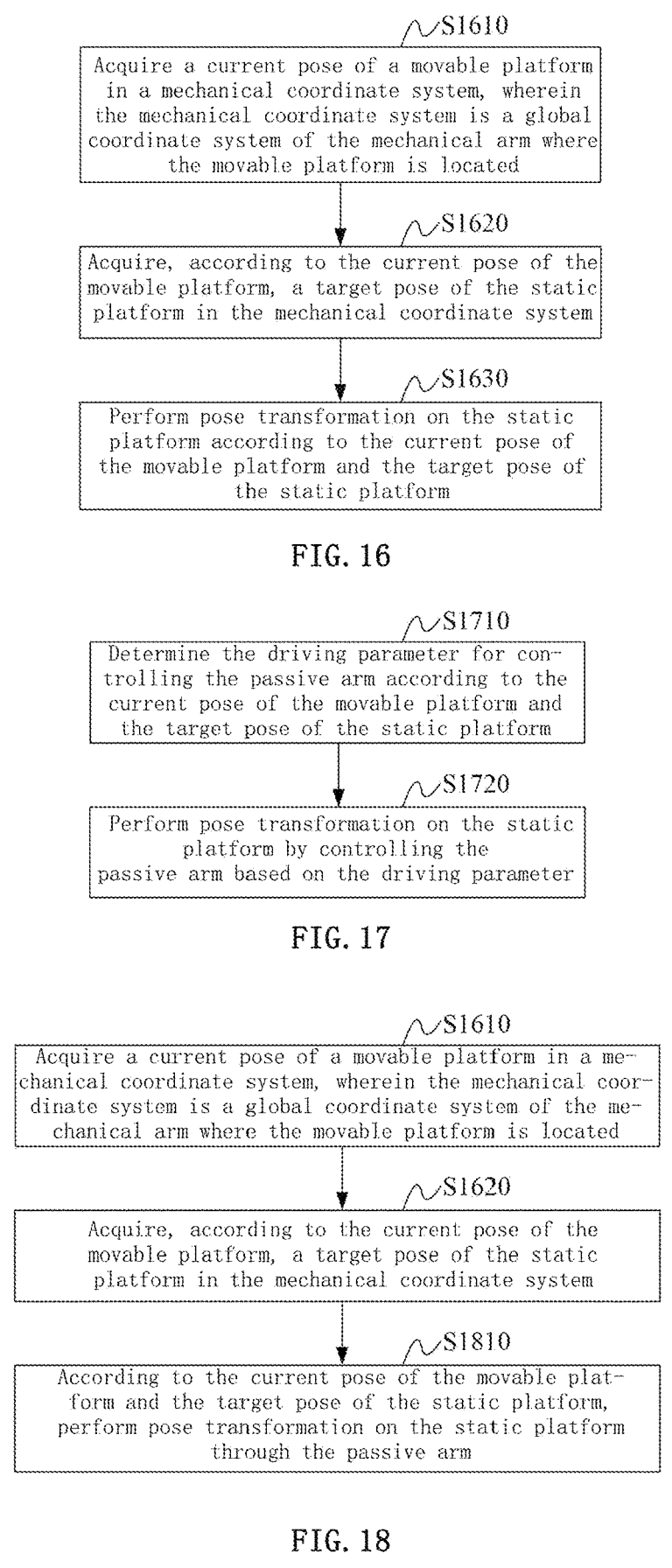

Acquire a current pose of a movable platform in a mechanical coordinate system, wherein the mechanical coordinate system is a global coordinate system of the mechanical arm where the movable platform is located

~S1620

Acquire, according to the current pose of the movable platform, a target pose of the static platform in the mechanical coordinate system

~S1630

Perform pose transformation on the static platform according to the current pose of the movable platform and the target pose of the static platform

Determine the driving parameter for controlling the passive arm according to the current pose of the movable platform and the target pose of the static platform

~S1720

Perform pose transformation on the static platform by controlling the passive arm based on the driving parameter

Acquire a current pose of a movable platform in a mechanical coordinate system, wherein the mechanical coordinate system is a global coordinate system of the mechanical arm where the movable platform is located

~S1620

Acquire, according to the current pose of the movable platform, a target pose of the static platform in the mechanical coordinate system

~S1810

According to the current pose of the movable platform and the target pose of the static platform, perform pose transformation on the static platform through the passive arm

FIG. 18

CONTROL METHOD OF MECHANICAL ARM, MECHANICAL ARM ASSEMBLY, AND STORAGE MEDIUM

CROSS-REFERENCE TO RELATED APPLICATION

The present application is a continuation application of International Patent Application No. PCT/CN2022/098189 filed of Jun. 10, 2022, and claims priority to Chinese Patent Application No. 202110682456.0 filed on Jun. 11, 2021, the entire contents of which are incorporated herein by reference.

TECHNICAL FIELD

The present disclosure relates to the technical field of robot, more specifically, to a control method of a mechanical arm, a mechanical arm assembly, and a storage medium.

BACKGROUND ART

The robot needs to be positioned before performing application operations to ensure that the end of an instrument reaches the corresponding operation space. For parallel robots, the positioning first relies on the motion of the series robotic arm to make the end of the instrument reach the operation space, and precise positioning is achieved by manipulating a parallel platform to make the end of the instrument reach the middle position of the operation space.

When the instrument is transferred to another distant position, if the instrument is directly moved to the target point through an active arm, the parallel platform may already be at the edge of the workspace. Therefore, it is necessary to adjust the parallel platform to a zero position state without changing the instrument position.

The active arm of the parallel robot has a small range of motion. After completing the positioning, the parallel platform is usually not at a zero position, which may result in the parallel platform being unable to cover the operation space of an application in the motion space, thereby resulting in the parallel platform being stuck in the extreme position and unable to complete the operation. Since a passive arm has a limited degree of freedom of motion, it is not possible to completely achieve the posture return to zero only through the motion of the passive arm.

SUMMARY

Embodiments of the present disclosure provide a control method of a mechanical arm, a mechanical arm assembly, and a readable storage medium.

First, embodiments of the present disclosure provide a control method for reconstructing a surgical field center of an instrument which includes:

acquiring a current pose of a movable platform in a mechanical coordinate system after reconstruction of a surgical field center of an instrument, wherein the mechanical coordinate system is a global coordinate system of a mechanical arm where the movable platform is located;

acquiring, according to the current pose of the movable platform, a target pose of a static platform in the mechanical coordinate system after the reconstruction of the surgical field center of an instrument, wherein the movable platform and the static platform form a parallel platform, in the mechanical arm, connected by means of a telescopic element, the center of the target pose of the static platform is located on a central axis of the current pose of the movable platform, and the static platform in the target pose is parallel to the movable platform;

performing pose transformation on the static platform according to the current pose of the movable platform and the target pose of the static platform; and acquiring an angle of twist between the movable platform and the static platform on a central axis according to the current pose of the movable platform and the target pose of the static platform; and performing rotation transformation on the movable platform according to the angle of twist to return a parallel platform to a zero position.

Second, embodiments of the present disclosure provide a control method of a mechanical arm, wherein the mechanical arm includes a parallel platform which includes a movable platform, a static platform and a telescopic element connecting the movable platform and the static platform. The method includes: acquiring a current pose of the movable platform in a mechanical coordinate system, wherein the mechanical coordinate system is a global coordinate system of the mechanical arm where the movable platform is located; acquiring a target pose of the static platform in the mechanical coordinate system according to the current pose of the movable platform, and performing pose transformation on the static platform according to the current pose of the movable platform and the target pose of the static platform.

Third, embodiments of the present disclosure provide a control method of a mechanical arm, wherein the method includes: acquiring a current pose of a movable platform in a mechanical coordinate system, wherein the mechanical coordinate system is a global coordinate system of the mechanical arm where the movable platform is located; acquiring, according to the current pose of the movable platform, a target pose of a static platform in the mechanical coordinate system, wherein the movable platform and the static platform form a parallel platform, in the mechanical arm, connected by means of a telescopic element; and performing pose transformation on the static platform according to the current pose of the movable platform and the target pose of the static platform.

Fourth, embodiments of the present disclosure provide a control system for reconstructing a surgical field center of an instrument which includes:

a first acquiring module configured to acquire a current pose of a movable platform in a mechanical coordinate system after reconstruction of a surgical field center of an instrument, wherein the mechanical coordinate system is a global coordinate system of a mechanical arm where the movable platform is located;

a second acquiring module configured to acquire, according to the current pose of the movable platform, a target pose of a static platform in the mechanical coordinate system after the reconstruction of the surgical field center of an instrument, wherein the movable platform and the static platform form a parallel platform, in the mechanical arm, connected by means of a telescopic element, a center of the target pose of the static platform is located on a central axis of the current pose of the movable platform, and the static platform in the target pose is parallel to the movable platform;

a first transformation module configured to perform pose transformation on the static platform according to the current pose of the movable platform and the target pose of the static platform; and a second transformation module configured to acquire an angle of twist between the movable platform and the static platform on a central axis according to the current pose of the movable platform and the target pose of the static platform, and performing rotation transformation on the movable platform according to the angle of twist to return the parallel platform to a zero position.

Fifth, embodiments of the present disclosure provide a control system of a mechanical arm, wherein the mechanical arm includes a parallel platform which includes a movable platform, a static platform and a telescopic element connecting the movable platform and the static platform. The system includes: a first acquiring module configured to acquire a current pose of the movable platform in a mechanical coordinate system, wherein the mechanical coordinate system is a global coordinate system of the mechanical arm where the movable platform is located; a second acquiring module configured to acquire, according to the current pose of the movable platform, a target pose of the static platform in the mechanical coordinate system; and a first transformation module configured to perform pose transformation on the static platform according to the current pose of the movable platform and the target pose of the static platform.

Sixth, embodiments of the present disclosure provide a mechanical arm assembly which includes: a mechanical arm; and a control device configured to perform pose transformation on a static platform on the mechanical arm, and performing rotation transformation on the movable platform on the mechanical arm according to the control method for a reconstructed surgical center of an instrument in the above first aspect, or performing pose transformation on the static platform on the mechanical arm according to the control method of the mechanical arm in the above second aspect.

Seventh, embodiments of the present disclosure provide a surgical robot which includes: a base; and a mechanical arm assembly as mentioned in the above sixth aspect.

Eighth, embodiments of the present disclosure provide a readable storage medium, on which an executable program is stored and, when being executed by a processor, implements the control method for reconstructing a surgical center of an instrument as above mentioned in the first aspect or the control method of a mechanical arm as above mentioned in the second aspect.

Ninth, embodiments of the present disclosure provide a computer program product which includes computer instructions, wherein the computer instructions, when being executed by a processor, implements the control method for reconstructing a surgical center of an instrument as above mentioned in the first aspect or the control method of a mechanical arm as above mentioned in the second aspect.

Details of one or more embodiments of the present disclosure are proposed in the following figures and descriptions so as to make other features, purposes and advantages of the present disclosure more concise and understandable.

BRIEF DESCRIPTION OF THE DRAWINGS

The accompanying drawings, which are explained here and constitute a part of the present disclosure, serve to further understand the present disclosure, and exemplary embodiments of the present disclosure and explanations thereof serve to explain the present disclosure but do not constitute inappropriate definition to the present disclosure. In the drawings:

FIG. 1 is a flow diagram of a control method for reconstructing a surgical field center of an instrument according to embodiments of the present disclosure;

FIG. 2 is an application diagram of a control method for reconstructing a surgical field center of an instrument according to embodiments of the present disclosure;

FIG. 3 is a joint diagram of a mechanical arm according to embodiments of the present disclosure;

FIG. 4 is a flow diagram of a first example of a step of performing pose transformation on a static platform according to embodiments of the present disclosure;

FIG. 5 is a flow diagram of a step of performing transformation on a posture parameter of a joint of a passive arm according to embodiments of the present disclosure;

FIG. 6 is a flow diagram of a step of performing transformation on a driving parameter of a second joint according to embodiments of the present disclosure;

FIG. 7 is a flow diagram of a second example of a step of performing pose transformation on a static platform according to embodiments of the present disclosure;

FIG. 8 is a flow diagram of a third example of a step of performing pose transformation on a static platform according to embodiments of the present disclosure;

FIG. 9 is a pose transformation diagram of a static platform in a parallel platform according to embodiments of the present disclosure;

FIG. 10 is a posture transformation schematic diagram of a static platform in a parallel platform according to embodiments of the present disclosure;

FIG. 11 is a flow diagram of a step of performing position transformation and posture transformation on a static platform according to embodiments of the present disclosure;

FIG. 12 is a system default initial position diagram of a parallel platform according to embodiments of the present disclosure;

FIG. 13 is a flow diagram of a first example of a step of performing rotation transformation on a movable platform according to embodiments of the present disclosure;

FIG. 14 is a flow diagram of a second example of a step of performing rotation transformation on a movable platform according to embodiments of the present disclosure;

FIG. 15 is a flow diagram of a step of acquiring a coordinate of a telecentric fixed point in a static coordinate system after reconstructing a surgical field according to embodiments of the present disclosure;

FIG. 16 is a flow diagram of a control method for a mechanical arm according to embodiments of the present disclosure;

FIG. 17 is a flow diagram of a step of performing pose transformation on a static platform in a control method of a mechanical arm according to embodiments of the present disclosure;

FIG. 18 is a flow diagram of a step of performing transformation on a posture parameter of a joint of a passive arm in a control method of a mechanical arm according to embodiments of the present disclosure;

DETAILED DESCRIPTION OF EXEMPLARY EMBODIMENTS

Figure 19:
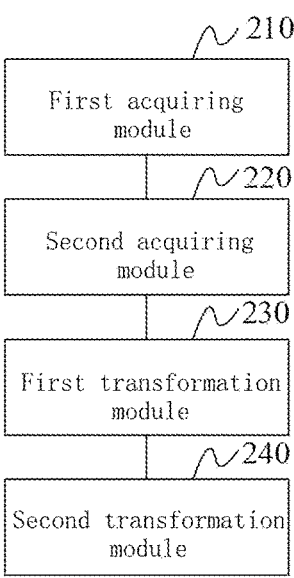
FIG. 19 is a structural block diagram of a control system for reconstructing a surgical field center of an instrument according to embodiments of the present disclosure.

In order to make the purpose, technical solution and advantages of the present disclosure more clear and understandable, below the present disclosure is described and explained in conjunction with accompanying drawings and embodiments. It shall be understood that specific embodiments described here only serve to explain the present disclosure but are not intended to limit the present disclosure. Based on the embodiments provided by the present disclosure, all the other embodiments obtained by those ordinary skilled in the art without creative work fall within the scope of protection of the present disclosure.

The reference to "embodiments" in the present disclosure means that specific features, structures, or characteristics described in conjunction with the embodiments may be included in at least one embodiment of the present disclosure. The phrase appearing in various positions in the description does not necessarily refer to the same embodiment, nor is it an independent or alternative embodiment that is mutually exclusive with other embodiments. It is understood by those ordinary skilled in the art, both explicitly and implicitly, that the embodiments described in the present disclosure may be combined with other embodiments without conflict.

Unless otherwise defined, the technical or scientific terms involved in the present disclosure shall have usual meanings understood by those general skilled in the art to which the present disclosure pertains. Similar words, such as "a", "one", "a kind", "this" and the like, involved in the present disclosure do not indicate quantity restrictions, but may indicate singular or plural numbers. The terms "include", "contain", "have" and any variations thereof involved in the present disclosure are intended to cover non-exclusive inclusion; for example, a process, method, system, product, or device that includes a series of steps or modules (units) is not limited to the listed steps or units, but may also include unlisted steps or units, or may also include other steps or units that are inherent to these processes, methods, products, or devices. The terms "connect", "join", "couple" and similar terms involved in the present disclosure are not limited to physical or mechanical connections, but may include electrical connections, regardless of direct or indirect. The term "multiple" involved in the present disclosure refers to two or more. "And/or" describes the association relationship of associated objects and indicates that there may be three relationships, for example, "A and/or B" may indicate: three situations, that is, A is present alone, A and B are present simultaneously, and B is present alone. The character "/" generally indicates that the front and back associated objects have an "or" relationship. The terms "first", "second", "third" and the like involved in the present disclosure are only used to distinguish similar objects without representing a specific order of objects. The articles "a", "an" and "the" are intended to include the plural forms as well, unless the context clearly indicates otherwise.

The present embodiment provides a control method for reconstructing a surgical field center of an instrument. FIG. 1 is a flow diagram of a control method for reconstructing a surgical field center of an instrument according to embodiments of the present disclosure. As illustrated in FIG. 1, the flow includes:

S110: acquire a current pose of a movable platform in a mechanical coordinate system after reconstruction of the surgical field center of an instrument, wherein the mechanical coordinate system is a global coordinate system of a mechanical arm where the movable platform is located;

in this step, the surgical field center of an instrument indicates the instrument at a center of surgical field of view, and the reconstruction of a surgical field center of an instrument indicates the surgical field center at the end of the mechanical arm of a parallel robot is not in a target area, and needs to be redetermined without changing a telecentric fixed point of the parallel robot, so that the surgical field center is in the target area; in the process of reconstructing the surgical field center of an instrument, the transfer of the surgical field center is usually achieved by moving the movable platform on the parallel platform of the parallel robot, but the movable and static platforms on the parallel platform are no longer at a zero position; the global coordinate system where the mechanical arm itself is located is a mechanical coordinate system applicable to respective components of the mechanical arm, and the poses of the movable and static platforms are mapped onto the mechanical coordinate system, which is conducive to the calculation of pose transformation in between.

Specifically, a mechanical coordinate system may be a global coordinate system where the entire mechanical arm is located in FIG. 3, and the origin of the global coordinate system may be a center of the base of the mechanical arm.

S120: acquire, according to the current pose of the movable platform, a target pose of a static platform in the mechanical coordinate system after the reconstruction of the surgical field center of an instrument, wherein the movable platform and the static platform form a parallel platform, in the mechanical arm, connected by means of a telescopic element, the center of the target pose of the static platform is located on a central axis of the current pose of the movable platform, and the static platform in the target pose is parallel to the movable platform;

in this step, the parallel platform is an important constituting portion of the mechanical arm and includes a movable platform, a telescopic element and a static platform, and since the relative poses of the static platform and the movable platform at a zero position are determined, the center of the target pose of the static platform is on the central axis of the current pose of the movable platform, and the static platform in the target pose is parallel to the movable platform, a target pose of the static platform in the mechanical coordinate system may be determined by using the current pose of the movable platform after the reconstruction of the surgical field center of an instrument.

S130: perform pose transformation on the static platform according to the current pose of the movable platform and the target pose of the static platform;

in this step, pose transformation is performed on the static platform by using the current pose of the movable platform and the target pose of the static platform as the targets of transformation, so that the static platform moves to the target pose, and the current pose of the movable platform in the mechanical coordinate system remains unchanged during this process.

S140: acquire an angle of twist between the movable platform and the static platform on a central axis according to the current pose of the movable platform and the target pose of the static platform; and perform rotation transformation on the movable platform according to the angle of twist to return a parallel platform to a zero position;

in this step, after the pose transformation of the static platform, the parallel platform cannot completely return to a zero position, there may also be a twist in the central axis direction of the movable platform between the movable platform and the static platform, and since it is no longer possible to return the parallel platform to a zero position by adjusting the posture of the static platform due to the limitation of the degree of freedom of a passive arm on the mechanical arm, it is chosen to control the rotation of the movable platform around the central axis to return the parallel platform to a zero position. The rotation of the movable platform causes the instrument to rotate around the central axis without violating the telecentric fixed point principle or changing the surgical field center of an instrument, which can effectively complete the reconstruction of the surgical field center.

In the present embodiment, through the above steps of acquiring a current pose of the movable platform in the mechanical coordinate system after the reconstruction of a surgical field center of an instrument; acquiring, according to the current pose of the movable platform, a target pose of the static platform in the mechanical coordinate system after the reconstruction of the surgical field center of an instrument; performing pose transformation on the static platform according to the current pose of the movable platform and the target pose of the static platform; acquiring an angle of twist between the movable platform and the static platform on a central axis according to the current pose of the movable platform and the target pose of the static platform; and performing rotation transformation on the movable platform according to the angle of twist to return a parallel platform to a zero position, the problem on difficultly achieving posture return to zero for parallel robots existing in the related art is solved, control accuracy of reconstructing the surgical field center of an instrument is improved and motion performance of a parallel platform is ensured.

It needs to be explained that the control method for reconstructing a surgical field center of an instrument of the present disclosure may be applied to multiple application scenarios. As illustrated in FIG. 2, in the front positioning operation, a front assistant establishes a surgical field center of an instrument while determining a telecentric fixed point by moving respective joints of the passive arm, so that an initial position of the end point of the instrument is located at the center of the surgical field. Since the instrument is not inserted into an object to be tested during the process, but the surgical field center of an instrument is roughly determined through visualization of the front assistant, it may have a significant deviation from an ideal surgical field center of an instrument. When the instrument is inserted into the object to be tested and a significant deviation is found, the solution of the present disclosure may be used to reconstruct the surgical field center of an instrument without changing the telecentric fixed point, in order to eliminate the deviation and obtain an ideal activity space for the instrument.

For another example, a workspace of the parallel platform is relatively small due to the swing angle limitation of the telescopic element (such as movable and static hinges), however, some certain scenarios may require a larger activity space. When the current workspace of the parallel platform cannot meet the requirement, or when phased operations have been completed in the current workspace, the surgical field center of an instrument may be reconstructed through the solution of the present disclosure, and the parallel platform workspace may be moved without changing the telecentric fixed point, thereby indirectly obtaining a larger activity space.

In some of these embodiments, as illustrated in FIG. 4, the performing pose transformation on the static platform according to the current pose of the movable platform and the target pose of the static platform includes:

S410: acquire a first transformation matrix from a static coordinate system to a movable coordinate system after reconstruction and returning to a zero position state according to the current pose of the movable platform and the target pose of the static platform; the static coordinate system is a coordinate system where the static platform is located, and the movable coordinate system is a coordinate system where the movable platform is located;

S420: acquire a second transformation matrix from the static coordinate system to the movable coordinate system after the reconstruction but not returning to a zero position state; and a third transformation matrix from the mechanical coordinate system to the static coordinate system before the reconstruction;

S430: acquire a fourth transformation matrix from the mechanical coordinate system to the static coordinate system after the reconstruction according to the first, second and third transformation matrices;

S440: acquire a fifth transformation matrix between joint coordinate systems of the passive arm in the mechanical arm according to the fourth transformation matrix, and perform transformation on posture parameters of the joints of the passive arm according to the fifth transformation matrix, wherein the passive arm is connected to the static platform.

In the present embodiment, there is a transformation relationship among the movable coordinate system, the static coordinate system, and the mechanical coordinate system before and after the reconstruction of the surgical field center of an instrument, which may be described through the transformation matrix. Four transformation matrices are used here: a first transformation matrix from the static coordinate system to the movable coordinate system after the reconstruction and returning to a zero position state; a second transformation matrix from the static coordinate system to the movable coordinate system after the reconstruction but not returning to a zero position state; a third transformation matrix from the mechanical coordinate system to the static coordinate system before the reconstruction; and a fourth transformation matrix from the mechanical coordinate system to the static coordinate system after the reconstruction. The first transformation matrix may be obtained according to the current pose of the movable platform and the target pose of the static platform, the second transformation matrix may be obtained according to the transformation relationship between the movable platform and the static platform, the third transformation matrix may be obtained according to joint information transformation of the passive arm of the mechanical arm, since the pose of the movable platform remains unchanged during the transformation process, and the product of the fourth transformation matrix and the first transformation matrix is the same as the product of the third transformation matrix and the second transformation matrix, by utilizing such an equivalent relationship, the fourth transformation matrix may be obtained, which reflects a transformation relationship from the passive arm in the mechanical arm to the parallel platform, the fifth transformation matrix among joint coordinate systems of the passive arm in the mechanical arm may be obtained accordingly, and the posture parameters of the joints of the passive arm are transformed using the fifth transformation matrix, to achieve the pose transformation of the static platform in the parallel platform through the posture transformation of the passive arm.

It should be noted that as illustrated in FIG. 2, the static coordinate system is the coordinate system where the static platform is located, before reconstructing the surgical field, the center S of the static platform is taken as the origin, the $X_S$ and $Y_S$ axes are parallel to the static platform plane, and the $Z_S$ axis is perpendicular to the static platform plane; after reconstructing the surgical field, the center S' of the static platform is taken as the origin, the $X'_S$ and $Y'_S$ axes are parallel to the static platform plane, and the $Z'_S$ axis is perpendicular to the static platform plane; the movable coordinate system is the coordinate system where the movable platform is located, before reconstructing the surgical field, the center M of the movable platform is taken as the origin, the $X_M$ and $Y_M$ axes are parallel to the movable platform plane, and the $Z_M$ axis is perpendicular to the movable platform plane; after reconstructing the surgical field, the center M' of the movable platform is taken as the origin, the $X'_M$ and $Y'_M$ axes are parallel to the movable platform plane, and the $Z'_M$ axis is perpendicular to the movable platform plane.

In some of these embodiments, as illustrated in FIG. 3, a passive arm 10 includes a first joint 11, a second joint 12, and a third joint 13 in series, wherein posture parameters of the first and third joints remain unchanged, the third joint is connected to a static platform 21 of a parallel platform 20, and a movable platform 22 and the static platform 21 are connected through a telescopic element 23;

as illustrated in FIG. 5, the performing transformation on the posture parameters of joints of the passive arm according to the fifth transformation matrix includes:

S510: acquire a sixth transformation matrix from the mechanical coordinate system to the coordinate system of the first joint and a seventh transformation matrix from the coordinate system of the second joint to the coordinate system of the third joint;

S520: acquire an eighth transformation matrix from the first joint to the second joint according to the fifth, sixth and seventh transformation matrices; and S530: perform transformation on the posture parameter of the second joint according to the eighth transformation matrix.

In the present embodiment, the passive arm includes a plurality of joints in series, when performing transformation on the posture parameters of the joints of the passive arm, the posture parameters of some joints thereof remain unchanged, and the posture parameters of the other joints thereof are changed. Since the posture parameters of the first and third joints remain unchanged, the sixth transformation matrix from the mechanical coordinate system to the coordinate system of the first joint and the seventh transformation matrix from the coordinate system of the second joint to the coordinate system of the third joint are both determined. By combining the fifth transformation matrix of the transformation target, the eighth transformation matrix for the posture parameter of the second joint may be obtained.

Based on the eighth transformation matrix, the posture parameter of the second joint may be transformed, which may use the less number of motion joints, reduce the calculation amount of posture parameters of the joints, and implement performing adjustment on the passive arm as soon as possible.

Furthermore, the first, second and third joints may all include one or more joints, and since the third joint is connected to the static platform, sufficient range of motion of the third joint is ensured when exiting the parallel platform after completing the operation.

In some of these embodiments, the second joint includes a first revolve pair, a first translation pair, a second revolve pair, a second translation pair, and a third revolve pair that are sequentially connected. The first revolve pair is rotationally connected to the first joint, and the third revolve pair is rotationally connected to the third joint;

as illustrated in FIG. 6, the performing transformation on a driving parameter of the second joint according to the eighth transformation matrix includes:

S610: acquire a driving parameter transformation relationship from the first joint to the third revolve pair, and solve to obtain driving parameters of the first revolve pair, the first translation pair, the second revolve pair, the second translation pair, and the third revolve pair according to the eighth transformation matrix and the driving parameter transformation relationship.

In the present embodiment, the second joint may include multiple joints, such as the first revolve pair, the first translation pair, the second revolve pair, the second translation pair, and the third revolve pair that are sequentially connected. The first revolve pair is rotationally connected to the first joint, and the third revolve pair is rotationally connected to the third joint. The second joint includes multiple joints that allow the passive arm to have a larger motion space. Due to the connection relationship among the various joints in the second joint, there is a certain transformation relationship among the driving parameters of respective joints. Combined with the eighth transformation matrix, the specific driving parameters of respective joints may be particularly solved to achieve the adjustment of the second joint of the passive arm.

Furthermore, in the second joint, the driving parameter of the first revolve pair may be a rotation angle $\theta 5$, the driving parameter of the first translation pair may be a movement distance d6, the driving parameter of the second revolve pair may be a rotation angle $\theta 7$, the driving parameters of the second translation pair may be a movement distance d8, and the driving parameter of the third revolve pair may be a rotation angle $\theta 9$, as shown in FIG. 3 for the details.

In some of these embodiments, as illustrated in FIG. 7, the performing pose transformation on the static platform according to the current pose of the movable platform and the target pose of the static platform includes:

S710: acquire a first telescopic amount of the telescopic element according to the current pose of the movable platform and the target pose of the static platform, and when performing pose transformation on the static platform, adjust the telescopic element according to the first telescopic amount to make the current pose of the movable platform in the mechanical coordinate system remain unchanged.

In the present embodiment, in addition to adjusting the pose of the static platform through the passive arm, it is also necessary to adjust the telescopic element between the movable platform and the static platform to ensure that the current pose of the movable platform in the mechanical coordinate system remains unchanged when performing pose transformation on the static platform, and the pose of the static platform is transformed to achieve that the parallel platform returns to a zero position.

Particularly, the solution of the present disclosure may be applied to the Stewart platform which may associate 10 joints connected in series.

In the specific work process, it may be divided into "a pose transformation stage" and "a stage of returning a movable coordinate system to a zero position".

The control of mechanical arms in series is usually based on DH parameters or improved DH parameters for transformation of the coordinate system. Two connected joints are adjacent joints. The transformation of the joint coordinate systems of two adjacent joints is generally represented by DH parameters or improved DH parameters. Taking the DH parameters as an example, two adjacent joint coordinate systems can coincide with each other by rotating around the Z axis $\theta$, translating d, rotating around the X axis $\alpha$ and then translating a. The above $\theta$, d, $\alpha$ and a are DH parameters. Accordingly, if the DH parameters are more concise, the transformation of two adjacent joint coordinate systems is simpler.

DH parameters of respective joints are known, and according to the forward kinematics of robot, the transformation matrix between two adjacent joints may be known as:

$$
{}^{i-1}_{i}T = \begin{bmatrix} \cos(\theta_i) & -\sin(\theta_i) & 0 & a_{i-1} \\ \sin(\theta_i)\times\cos(\alpha_{i-1}) & \cos(\theta_i)\times\cos(\alpha_{i-1}) & -\sin(\alpha_{i-1}) & -d_i\times\sin(\alpha_{i-1}) \\ \sin(\theta_i)\times\sin(\alpha_{i-1}) & \sin(\theta_i)\times\sin(\alpha_{i-1}) & \cos(\alpha_{i-1}) & d_i\times\cos(\alpha_{i-1}) \\ 0 & 0 & 0 & 1 \end{bmatrix} \quad (1)
$$

The transformation matrix from the mth joint (including a degree of freedom of the mth joint) to the nth joint may be represented as:

$$
{}^{m}_{n}T = {}^{m}_{m+1}T \cdot {}^{m+1}_{m+2}T \cdots {}^{n-2}_{n-1}T \cdot {}^{n-1}_{n}T \quad (2)
$$

After the reconstruction of the surgical field center of an instrument, according to that the poses of the movable platform in the mechanical coordinate system remain unchanged before and after motion on the Stewart platform, the following Equation may be established:

$$
T\_0\_4 \times T\_4\_9_1 \times T\_9\_10 \times T\_s\_end\_m\_end = \quad (3)
$$
$$
T\_machine\_s\_begin \times T\_s\_begin\_m_{end}
$$

where T_0_4 represents a transformation matrix from the mechanical coordinate system to the fourth joint coordinate system; T_4_9$_1$ represents a transformation matrix from the fourth joint coordinate system to the ninth joint coordinate system after the reconstruction and returning to the zero position state; T_9_10 represents a transformation matrix from the ninth joint coordinate system to the tenth joint coordinate system; T_s_end_m_end represents a transformation matrix from a static coordinate system to a movable coordinate system on the Stewart platform after the reconstruction and returning to a zero position state; T_machine_s_begin represents a transformation matrix from a mechanical coordinate system to a static coordinate system before the reconstruction; and T_s_begin_m_end represents a transformation matrix from a static coordinate system to a movable coordinate system when the Stewart platform does not return to a zero position state after the reconstruction.

It may be obtained from Equation (3)

$$
T\_4\_9_1 = T\_0\_4^{-1} \times T\_machine\_s\_begin \times T\_s\_begin\_m\_end \quad (4)
$$
$$
\times T\_s\_end\_m\_end^{-1} \times T\_9\_10^{-1} = T\_4\_9_0 \times T\_9\_
$$
$$
10 \times T\_s\_begin\_m\_end \times T\_s\_end\_m\_end^{-1} \times T\_9\_10^{-1}
$$

wherein the left side of the Equation is the transformation matrix containing the parameters to be solved, the right side of the Equation is all known quantities, T_4_9$_0$ represents the transformation matrix when the DH parameters of the fifth to ninth joints have not been updated, and T_4_9$_1$ represents the transformation matrix from the fourth joint coordinate system to the ninth joint coordinate system after the reconstruction and returning to a zero position state. Since the DH parameters of the first to fourth and tenth passive arms do not change during the whole process, respective matrix expressions may be solved accordingly:

$$
T\_0\_4 = \begin{bmatrix} \cos(\theta_2-\theta_4) & \sin(\theta_2-\theta_4) & 0 & -d_3\sin\theta_2 \\ \sin(\theta_2-\theta_4) & -\cos(\theta_2-\theta_4) & 0 & d_3\cos\theta_2 \\ 0 & 0 & -1 & d_1 \\ 0 & 0 & 0 & 1 \end{bmatrix} \quad (5)
$$

$$
T\_machine\_s\_begin = T\_0\_4 \times T\_4\_9_0 \times T\_9\_10 \quad (6)
$$

$$
T\_9\_10 = \begin{bmatrix} 1 & 0 & 0 & 0 \\ 0 & 0 & -1 & -d_{10} \\ 0 & 1 & 0 & 0 \\ 0 & 0 & 0 & 1 \end{bmatrix} \quad (7)
$$

$$
T\_s\_end\_m\_end = \begin{bmatrix} 1 & 0 & 0 & 0 \\ 0 & 1 & 0 & 0 \\ 0 & 0 & 1 & m_{oz} \\ 0 & 0 & 0 & 1 \end{bmatrix} \quad (8)
$$

In Equation (8), $m_{oz}$ represents a distance between the movable coordinate system and the static coordinate system in the Z axis direction of the static coordinate system in the zero position state.

Let $\phi_x$, $\phi_y$ and $\phi_z$ be the Euler angles around the x, y, and z axes, respectively, and $m_x$, $m_y$, and $m_z$ are the coordinate positions of the movable coordinate system in the static coordinate system at any time, respectively, then the transformation matrix from the static coordinate system to the movable coordinate system at any time is:

$$T\_s\_end\_m\_end = \tag{9}$$

$$\begin{bmatrix} \cos\phi_y\cos\phi_z & -\cos\phi_y\sin\phi_z & \sin\phi_y & m_x \\ \begin{matrix}\cos\phi_x\sin\phi_z + \\ \cos\phi_z\sin\phi_x\sin\phi_y\end{matrix} & \begin{matrix}\cos\phi_x\cos\phi_z - \\ \sin\phi_x\sin\phi_y\sin\phi_z\end{matrix} & -\cos\phi_y\sin\phi_x & m_y \\ \begin{matrix}\sin\phi_x\sin\phi_z - \\ \cos\phi_x\cos\phi_z\sin\phi_y\end{matrix} & \begin{matrix}\sin\phi_x\cos\phi_z + \\ \cos\phi_x\sin\phi_y\sin\phi_z\end{matrix} & \cos\phi_x\cos\phi_y & m_z \\ 0 & 0 & 0 & 1 \end{bmatrix}$$

As illustrated in FIG. 3, an expression may be obtained by the transformation matrix from the fourth joint coordinate system to the ninth joint coordinate system:

$$T\_4\_9 = \tag{10}$$

$$\begin{bmatrix} \sin\theta_9\sin(\theta_7-\theta_5) & \cos\theta_9\sin(\theta_7-\theta_5) & -\cos(\theta_7-\theta_5) & -d_6\sin\theta_5+a_4 \\ \sin\theta_9\cos(\theta_7-\theta_5) & \cos\theta_9\cos(\theta_7-\theta_5) & \sin(\theta_7-\theta_5) & d_6\sin\theta_5 \\ \cos\theta_9 & -\sin\theta_9 & 0 & -d_8 \\ 0 & 0 & 0 & 1 \end{bmatrix}$$

By equating the corresponding elements of the matrices on both sides of Equation (4), the DH parameters of the fifth to ninth joints to be updated may be obtained. When establishing an equation relationship, the following Equation may be satisfied first due to the presence of 0 element in T_4_9:

$$T\_4\_9_1[3, 3] = 0 \tag{11}$$

After deduction, $$T\_4\_9_1[3, 3] = \sin\theta_9(\sin\phi_x\cos\phi_z + \cos\phi_x\sin\phi_y\sin\phi_z) - \cos\theta_9\cos\phi_y\sin\phi_z \tag{12}$$

then $\sin\theta_9(\sin\phi_x\cos\phi_z + \cos\phi_x\sin\phi_y\sin\phi_z) - \cos\theta_9\cos\phi_y\sin\phi_z = 0$ where $\theta_9$ is the DH parameter of the ninth joint arm of the series arm, $\phi_x$ is the Euler angle of the movable coordinate system around its own X axis, and $\phi_z$ is the Euler angle of the movable coordinate system around its own Z axis.

It may be obtained from Equation (12):

when $\sin\theta_9 \cos\phi_x \sin\phi_y - \cos\theta_9 \cos\phi_y = 0$, $\phi_z = 90°$;

when $\sin\theta_9 \cos\phi_x \sin\phi_y - \cos\theta_9 \cos\phi_y \neq 0$, it may be obtained by combining Equations (2), (3) and $\theta_9$;

$$\phi_z = \arctan\left(\frac{\sin\theta_9\sin\phi_x}{\cos\theta_9\cos\phi_y - \sin\theta_9\cos\phi_x\sin\phi_y}\right) \tag{13}$$

The transformation matrix corresponding to the rotational motion in the Z axis direction between the movable coordinate system and the static coordinate system throughout the reconstruction process is denoted as T_rota_z:

$$T\_rota\_z = \begin{bmatrix} \cos(\phi_z) & -\sin(\phi_z) & 0 & 0 \\ \sin(\phi_z) & \cos(\phi_z) & 0 & 0 \\ 0 & 0 & 1 & 0 \\ 0 & 0 & 0 & 1 \end{bmatrix} \tag{14}$$

then the transformation matrix T_s_m_input between the movable coordinate system and the static coordinate system when the static platform is adjusted to be parallel to the movable platform and the movable platform has not yet moved during the reconstruction of the surgical field is:

$$T\_s\_m\_input = T\_s\_begin\_m\_end \times T\_rota\_z^{-1} \tag{15}$$

$$= \begin{bmatrix} \cos\phi_x & 0 & \sin\phi_y & m_x \\ \sin\phi_x\sin\phi_y & \cos\phi_x & -\sin\phi_x\cos\phi_y & m_y \\ -\cos\phi_x\sin\phi_y & \sin\phi_x & \cos\phi_x\cos\phi_y & m_z \\ 0 & 0 & 0 & 1 \end{bmatrix}$$

T_s_m_input is obtained by calculation according to the position information transmitted by a main hand, which is a known quantity. According to Equation (15), the Euler angles of the movable coordinate system around its own X and Y axes may be calculated:

$$\phi_x = \arcsin(T\_s\_m\_input(3, 2))$$

$$\phi_y = \arcsin(T\_s\_m\_input(1, 3))$$

At this point, the reconstruction process of the surgical field may be divided into "a pose transformation stage" and "a stage of returning a movable coordinate system to a zero position". The "pose transformation stage" is the process of keeping the pose of the movable platform in the mechanical coordinate system unchanged and moving the static platform to a position parallel to the movable platform and collinear to the Z axis; "a stage of returning a movable coordinate system to a zero position" is the process of rotating the movable platform around its own Z axis $\phi_z$ to make the Stewart platform return to a zero position.

Before and after the reconstruction, the transformation matrix of the static coordinate system and the transformation matrices of the movable coordinate system and the static coordinate system have the following relationship:

$$T\_machine\_s\_begin \times T\_s\_begin\_m\_end = T\_machine\_s\_end \times T\_s\_end\_m\_end \tag{16}$$

Thus, the transformation matrix representing the pose of the static coordinate system after the reconstruction is:

$$T\_machine\_s\_end = T\_machine\_s\_begin \times T\_s\_begin\_m\_end \times T\_s\_end\_m\_end^{-1} \tag{17}$$

where T_machine_s_end is a transformation matrix from the mechanical coordinate system to the static coordinate system after the reconstruction, and T_s_end_m_end is a zero position transformation matrix for the movable coordinate system and the static coordinate system, and $$T\_s\_end\_m\_end = \begin{bmatrix} 1 & 0 & 0 & 0 \\ 0 & 1 & 0 & 0 \\ 0 & 0 & 1 & m_z \\ 0 & 0 & 0 & 1 \end{bmatrix} \tag{18}$$

At this point, the motion target of "the pose transformation stage" may be explicit:

① Series joint arm motion target: T_machine_s_begin→T_machine_s_end;

② Stewart platform motion target: T_s_m_input→T_s_end_m_end×T_rota_z ($\phi_z$ here is taken as $-\phi_z$, since the movable platform rotates around its own Z axis, the total angle is $\phi_z$, then, relative to the zero position state, the Euler angle description between the movable coordinate system and the static coordinate system should be $-\phi_z$ during the rotation process).

In some of these embodiments, as illustrated in FIG. 8, the performing pose transformation on the static platform according to the current pose of the movable platform and the target pose of the static platform includes:

S810: acquire the original pose of the static platform before the reconstruction, interpolate the original pose and the target pose of the static platform, and acquire the intermediate pose of the static platform during the pose transformation process;

S820: perform position transformation and posture transformation on the static platform according to the intermediate pose and the current pose of the movable platform, wherein the position transformation includes a circular arc motion transformation with a telecentric fixed point as the center of a circle and a linear motion transformation pointing towards the center of a circle, and the posture transformation includes rotation transformation of the static coordinate system around the Z axis of the mechanical coordinate system and rotation transformation of the static coordinate system around its own Y axis.

In the present embodiment, the original pose and the target pose of the static platform are interpolated to obtain an intermediate pose of the static platform during the pose transformation process. The intermediate pose may be used to plan the path for the static platform to return to a zero position. Position transformation and pose transformation are performed on the static platform on this path to keep smooth motion of the static platform and ensure the motion accuracy of the static platform.

Furthermore, both the circular arc motion transformation with a telecentric fixed point as the center of a circle and the linear motion transformation pointing towards the center of a circle may be performed simultaneously during the position transformation. The rotation transformation of the static coordinate system around the Z axis of the mechanical coordinate system and the rotation transformation of the static coordinate system around its own Y axis may also be performed simultaneously during the posture transformation.

Specifically, interpolation and kinematic solution are performed on the motion of the static platform during the "pose transformation stage". According to the confirmed motion target, pose interpolation is performed on the motion process of the static coordinate system, as shown in FIG. 9.

(1) Position Interpolation

The goal of position interpolation is to move the static coordinate system from its position in the space before the reconstruction, along a certain trajectory, from S0 shown in FIG. 9 to the target position S1 after the reconstruction. First, the motion trajectory is found through motion planning, then a coordinate system with a telecentric point as the origin is established, the points of the motion trajectory curve are mapped to the coordinate system, and finally the coordinates of the motion trajectory points in the mechanical coordinate system are solved through the newly established coordinate system transformation matrix.

As illustrated in FIG. 3, the position interpolation process is divided into two motions. Motion 1: a circular arc motion with the telecentric point as the center of a circle and r0 as the radius; motion 2: a linear motion along a radius r pointing towards the center of a circle, that is, the motion with a radius r0 constantly changing. The motion trajectory formed by the combination of the two is a static coordinate system motion trajectory as shown in FIG. 9, which is a curved motion with a radius changing from r0 to r1.

Wherein a variable $\theta r$ symbolizing the circular arc motion changes from 0 to $\theta$ with $\Delta\theta$ as an increment, a variable r symbolizing the linear motion changes from r0 to r1 and from 0 to $\theta$ with $\Delta r$ as a variation, during the processes, the number of interpolation points is set to be N, then the angle $\theta r$ between the i-th interpolation point and the initial position and the radius r:

$$\Delta\theta = \frac{\theta}{N}, \theta_r = 0 + i\Delta\theta \tag{19}$$

$$\Delta r = \frac{r_0 - r_1}{N}, r = r_0 - i\Delta r \tag{20}$$

The telecentric point F is taken as the origin OF, the vector $\overrightarrow{FS_0}$ is in the forward direction of the XF axis, and the result of $\overrightarrow{FS_1} \otimes \overrightarrow{FS_0}$ is in the forward direction of the ZF axis. The forward direction of the YF axis satisfies the right-hand rule, and the telecentric point coordinate system $O_F\text{-}X_F Y_F Z_F$ as shown in FIG. 3 is established, then the coordinate value of the i-th interpolation point in the telecentric point coordinate system is:

$$x = r \times \cos\theta_r, y = r \times \sin\theta_r, z = 0 \tag{21}$$

recorded as location_pre(i)=[r×cos $\theta_r$; r×sin $\theta_r$; 0; 1]

The pose matrix T_machine_dm of the telecentric point coordinate system $O_F\text{-}X_F Y_F Z_F$ in the mechanical coordinate system is recorded as:

$$T\_machine\_dm = \begin{bmatrix} n_x & o_x & a_x & x_F \\ n_y & o_y & a_y & y_F \\ n_z & o_z & a_z & z_F \\ 0 & 0 & 0 & 1 \end{bmatrix} \tag{22}$$

Where $n_x$, $n_y$ and $n_z$ are the cosine values of the angles between the Xdm axis and the global x, y, and z axes; $o_x$, $o_y$ and $o_z$ are the cosine values of the angles between the Ydm axis and the global x, y, and z axes; $a_x$, $a_y$ and $a_z$ are the cosine values of the angles between the Zdm axis and the global x, y, and z axes; and $X_F$, $Y_F$, $Z_F$ are the coordinates of the telecentric point in the mechanical coordinate system.

According to the establishment of the previous coordinate system, respective parameters may be obtained as follows, where fix is the coordinate of the telecentric point in the static coordinate system before the reconstruction, and is a known quantity:

$$[x_F; y_F; z_F; 1] = \text{T\_machine\_s\_begin} \times \text{fix} \qquad (23)$$

$$n_x = \frac{\overrightarrow{FS_{o_x}}}{|\overrightarrow{FS_{o_x}}|}; \ n_y = \frac{\overrightarrow{FS_{o_y}}}{|\overrightarrow{FS_{o_y}}|}; \ n_z = \frac{\overrightarrow{FS_{o_z}}}{|\overrightarrow{FS_{o_z}}|}; \qquad (24)$$

$$a_x = \frac{\left(\overrightarrow{FS_1} \otimes \overrightarrow{FS_o}\right)_x}{|\overrightarrow{FS_o}|}; \ a_y = \frac{\left(\overrightarrow{FS_1} \otimes \overrightarrow{FS_o}\right)_y}{|\overrightarrow{FS_o}|}; \ a_z = \frac{\left(\overrightarrow{FS_1} \otimes \overrightarrow{FS_o}\right)_z}{|\overrightarrow{FS_o}|}; \qquad (25)$$

$$\begin{cases} o_x = a_y \times n_z - a_z \times n_y; \\ o_y = a_z \times n_x - a_x \times n_z; \\ o_z = a_x \times n_y - a_y \times n_x; \end{cases} \qquad (26)$$

Equations (23)-(26) are substituted into Equation (22) to obtain the pose matrix T_machine_dm of the telecentric point coordinate system in the global coordinate system, then the coordinate value location (i) of the i-th interpolation point in the global coordinate system is:

$$\text{location } (i) = \text{T\_machine\_dm} \times \text{location\_pre}(i) \qquad (27)$$

At this point, the position interpolation work is completed, and the global coordinates of each interpolation point in the motion trajectory are stored in the array location. Next, posture interpolation is performed.

(2) Posture Interpolation

The posture interpolation target is to transform the posture of the static coordinate system before the reconstruction into a target posture after the reconstruction according to certain rules, as shown in FIG. 10. Due to mechanical structural limitations, during the posture transformation process, the $Y_0$ axis of the static coordinate system needs to be parallel to the XY plane of the global coordinate system at all times. As illustrated in FIG. 9, the posture transformation is divided into two portions: ① the static coordinate system rotates around the global Z axis; and ② the static coordinate system rotates around its own $Y_0$ axis. Therefore, first, two rotation angles are solved through the posture relationship of the static coordinate system before and after the reconstruction, and then the two angles are linearly interpolated, respectively, finally, a series of continuous transformation arrays composed of respective interpolation points are obtained.

Since two transformation processes both satisfy parallel conditions, they may be performed simultaneously. Therefore, the posture transformation process may be described as follows:

$$\text{R\_rotate\_posture} = \text{R\_z} \times \text{R\_machine\_s\_begin} \times \text{R\_y} \qquad (28)$$

where R_rotate_position represents the rotation matrix of the i-th interpolation point in the global coordinate system; R_machine_s_begin is the rotation transformation matrix of the static coordinate system before the reconstruction, which is composed of 9 elements in rows 1-3 and columns 1-3 of the transformation matrix T_machine_s_begin; R_a represents the transformation process around the global Z axis; R_y represents the transformation process around the $Y_0$ axis of the static coordinate system.

$$\text{R\_z} = \begin{bmatrix} \cos\theta_z & -\sin\theta_z & 0 \\ \sin\theta_z & \cos\theta_z & 0 \\ 0 & 0 & 1 \end{bmatrix} \qquad (29)$$

$$\text{R\_z} = \begin{bmatrix} \cos\theta_y & 0 & \sin\theta_y \\ 0 & 1 & 0 \\ -\sin\theta_y & 0 & \cos\theta_y \end{bmatrix} \qquad (30)$$

where $\theta_z$ and $\theta_y$ represent the rotation angles of the i-th interpolation point and the static coordinate system before the reconstruction around the global Z axis and its own $Y_0$ axis, respectively. It may be obtained from Equation (28) that the posture rotation matrix before and after the reconstruction should satisfy:

$$R = \text{R\_machine\_s\_end} \times \text{R\_y}^{-1} = \text{R\_z} \times \text{R\_machine\_s\_begin} \qquad (31)$$

where R_machine_s_end is the rotation matrix of the static coordinate system after the reconstruction, which is composed of 9 elements in rows 1-3 and columns 1-3 of the transformation matrix T_machine_s_end; by taking the matrix elements R (1,2) and R (2,2) on both sides of Equation (31), it can be obtained:

$$\begin{cases} \text{R\_machine\_s\_end}(1,2) = \begin{aligned} &\cos\theta_z \times \text{R\_machine\_s\_begin}(1,2) - \\ &\sin\theta_z \times \text{R\_machine\_s\_begin}(2,2) \end{aligned} \\ \text{R\_machine\_s\_end}(2,2) = \begin{aligned} &\sin\theta_z \times \text{R\_machine\_s\_begin}(1,2) + \\ &\cos\theta_z \times \text{R\_machine\_s\_begin}(2,2) \end{aligned} \end{cases}$$

According to the above equation system, the required rotation angle $\theta_z$ for transforming from the state before the reconstruction to the state after the reconstruction may be obtained by dividing the two equations, recorded as $\alpha_z$.

$$\text{Let } a = \frac{\text{R\_machine\_s\_end}(1,2)}{\text{R\_machine\_s\_end}(2,2)} \qquad (32)$$

$$\alpha_z = \arctan\left(\frac{\text{R\_machine\_s\_begin}(1,2) - a \times \text{R\_machine\_s\_being}(2,2)}{a \times \text{R\_machine\_s\_being}(1,2) + \text{R\_machine\_s\_begin}(1,2)}\right)$$

Similarly, it may be obtained by taking the matrix elements R (3,1) and R (3,3) of Equation (31)

$$\begin{cases} \text{R\_machine\_s\_end}(3,1) = \begin{aligned} &\cos\theta_y \times \text{R\_machine\_s\_begin}(3,1) + \\ &\sin\theta_y \times \text{R\_machine\_s\_begin}(3,3) \end{aligned} \\ \text{R\_machine\_s\_end}(3,3) = \begin{aligned} &\cos\theta_y \times \text{R\_machine\_s\_begin}(3,3) - \\ &\sin\theta_y \times \text{R\_machine\_s\_begin}(3,1) \end{aligned} \end{cases}$$

According to the above equation system, the required rotation angle $\theta_y$ for transforming from the state before the reconstruction to the state after the reconstruction may be obtained by dividing the two equations, recorded as $\alpha_y$.

$$\text{Let } b = \frac{\text{R\_machine\_s\_end}(3,1)}{\text{R\_machine\_s\_end}(3,3)} \qquad (33)$$

$$\alpha_y = \arctan\left(\frac{b \times \text{R\_machine\_s\_begin}(3,3) - \text{R\_machine\_s\_end}(3,1)}{b \times \text{R\_machine\_s\_being}(3,1) + \text{R\_machine\_s\_begin}(3,3)}\right)$$

Throughout the entire posture transformation process, $\theta_z$ and $\theta_y$ change from 0 to $\alpha_z$ and $\alpha_y$ with $\Delta\theta_z$ and $\Delta\theta_y$ as increments, respectively, and the number of interpolation points, which is the same as the position interpolation, is N, then the rotation angle parameters $\theta_z$ and $\theta_y$ of the i-th interpolation point may be expressed as $$\Delta\theta_z = \frac{\alpha_z}{N}, \theta_z = 0 + i\Delta\theta_z \tag{34}$$

$$\Delta\theta_y = \frac{\alpha_y}{N}, \theta_y = 0 + i\Delta\theta_y \tag{35}$$

the parameters of the i-th interpolation point are recorded in the array posture, which may be expressed as:

$$\begin{cases} \text{posture}(1, i) = \theta_z \\ \text{posture}(2, i) = \theta_y \end{cases} \tag{36}$$

At this point, the posture interpolation work is completed, and the posture coordinates of all interpolation point are recorded in the array posture.

In some of these embodiments, as illustrated in FIG. 11, the performing position transformation and posture transformation on the static platform according to the intermediate pose and the current pose of the movable platform includes:

S1110: transform the intermediate pose into the ninth transformation matrix from the static coordinate system to the mechanical coordinate system and the tenth transformation matrix from the static coordinate system to the movable coordinate system; the static coordinate system is a coordinate system where the static platform is located, and the movable coordinate system is a coordinate system where the movable platform is located;

S1120: perform transformation on the posture parameter of the joint of the passive arm according to the ninth transformation matrix and the tenth transformation matrix, wherein the passive arm is connected to the static platform;

S1130: acquire a second telescopic amount of the telescopic element according to the ninth transformation matrix and the tenth transformation matrix, and adjust the telescopic element according to the second telescopic amount to make the current pose of the movable platform in the mechanical coordinate system remain unchanged.

In the present embodiment, the position transformation and posture transformation of the static platform according to the intermediate pose and the current pose of the movable platform need to be implemented through the posture parameter transformation of the joints of the passive arm and the telescopic adjustment of the telescopic element. The intermediate pose is transformed into the ninth transformation matrix from the static coordinate system to the mechanical coordinate system and the tenth transformation matrix from the static coordinate system to the movable coordinate system. The ninth and tenth transformation matrices are used to acquire the posture parameters of the joints of the passive arm and the second telescopic amount of the telescopic element, and further perform the intermediate pose transformation to keep smooth motion of the static platform and ensure the motion accuracy of the static platform.

Furthermore, after obtaining the posture parameters of the joints of the passive arm and the second telescopic amount of the telescopic element, the driving parameters of the joints of the passive arm and a driving parameter of the telescopic element may be further parsed to achieve the posture parameters of the joints of the above passive arm and the second telescopic amount of the telescopic element.

Specifically, the parsing of the posture parameters of the joints of the passive arm and the second telescopic amount of the telescopic element may be referred to as pose interpolation kinematic solution. The kinematic solution part transforms the parameters obtained through (1) position interpolation and (2) posture interpolation into a transformation matrix describing the static coordinate system pose and a transformation matrix between the movable coordinate system and the static coordinate system, then solves them separately to the motion drives of the series joint arm and the Stewart platform, and finally obtains the required driving parameters.

According to (1) position interpolation and (2) posture interpolation, it may be seen that the position description of the i-th interpolation point is obtained from the array location, and the posture description is obtained from the array posture. The rotation angle of the i-th interpolation point may be transformed into the rotation matrix R_rotate_position(i) through Equation (28), then the transformation matrix from the mechanical coordinate system to the static coordinate system of the point may be expressed as:

$$\text{T\_machine\_s\_i} = \begin{bmatrix} & \text{location}(i)(1,1) \\ \text{R\_rotate\_posture}(i) & \text{location}(i)(2,1) \\ & \text{location}(i)(3,1) \\ 0 & 1 \end{bmatrix} \tag{37}$$

at this point, the transformation matrix between the movable coordinate system and the static coordinate system may be expressed as:

$$\text{T\_s\_m\_i} = \text{T\_machine\_s\_i}^{-1} \times \text{T\_machine\_m\_mid} \tag{38}$$

where T_machine_m_mid=T_machine_s_begin× T_s_m_input.

① To solve series joint arm driving parameters: T_s_begin_m_end in Equation (4) is replaced with T_s_m_input, correspondingly, T_s_end_m_end in Equation (4) is replaced with T_s_m_i, which still satisfy the equation and obtains $$\text{T\_0\_4} \times \text{T\_4\_9}_i \times \text{T\_9\_10} \times \text{T\_s\_m\_i} = \tag{39}$$

$$\text{T\_machine\_s\_begin} \times \text{T\_s\_m\_input}$$

where $\text{T\_4\_9}_i$ represents a transformation matrix from the fourth joint coordinate system to the ninth joint coordinate system of the i-th interpolation point.

It may be obtained from Equation (38)

$$\text{T\_4\_9}_i \times \text{T\_0\_4}^{-1} \times \text{T\_machine\_s} \tag{40}$$

$$\_\text{begin} \times \text{T\_s\_m\_input} \times \text{T\_s\_m\_i}^{-1} \times \text{T\_9\_10}^{-1} =$$

$$\text{T\_4\_9}_0 \times \text{T\_9\_10} \times \text{T\_s\_m\_input} \times \text{T\_s\_m\_i}^{-1} \times \text{T\_9\_10}^{-1}$$

According to Equation (40), the corresponding terms of the matrices on both sides are equal, and the expressions of respective parameters to be solved in the series joint arm may be obtained by comprehensively taking into account the range of values obtained from the inverse trigonometric function of matlab:

$$\theta_{7i} = \arcsin \left[ T\_4\_9_i(2, 3) \times \cos\theta_5 - T\_4\_9_i(1, 3) \times \sin\theta_5 \right] \tag{41}$$

$$d_{8i} = -T\_4\_9_1(3, 4) \tag{42}$$

$$\theta_{9i} = \arcsin T\_4\_9_i(3, 2) \tag{43}$$

a) If $T\_4\_9_i(2,4)=0$, then:

$$\theta_{si} = 90° \tag{44}$$

$$d_{6i} = a_4 - T\_4\_9_i(1, 4) \tag{45}$$

b) If $T\_4\_9_i(2,4) \neq 0$, then:

$$\theta_{si} = \arccos(T\_4\_9_i(2, 4)/d_6) \tag{46}$$

$$d_{6i} = \sqrt{T\_4\_9_i(2, 4)^2 + T\_4\_9_i(1, 4) - a_4)^2} \tag{47}$$

and the calculated N sets of DH parameters are stored in the array dh_update_po.

② Stewart Drive Solution Process:

According to the establishment of the Stewart coordinate system, the relative coordinates of the movable hinge point in the movable coordinate system and the static hinge joint in the static coordinate system are calculated. Taking the calculation of the coordinate of the static hinge joint as an example, according to the previous description, first, the static hinge joint $S_i$ (i=1~6) is moved from the origin $O_S$ of the static coordinate system to the intersection point of the $X_S$ axis of the static coordinate system and the platform distribution circle of the static coordinate system (as shown in (c) in FIG. 12), where the coordinate value is (rs, 0).

According to the plane coordinate rotation theorem, the coordinate after any coordinate point at (x, y) rotates around the origin by an angle $\theta$ is expressed as $$x' = x\cos\theta - y\sin\theta, \; y' = x\sin\theta + y\cos\theta \tag{48}$$

If the coordinate $(r_s, 0)$ is taken as the values of x and y in Equation (48), then the coordinate thereof may be expressed as $$(ss_{ix}, ss_{iy}) = (r_s\cos\theta_{si}, r_s\sin\theta_{si}) \tag{49}$$

where $\theta_{si}$ is the rotation angle rotating from the intersection point to the corresponding hinge point centered on the origin of the static coordinate system.

The origin of the static platform coordinate system is defined at the center of the plane where the static hinge joint is located. Therefore, the ZS axial coordinate of any static hinge joint in the static coordinate system is 0. Meanwhile, by taking into account coordinate rotation and translation transformation, the homogeneous coordinates of the static hinge joint in the static platform may be obtained:

$$S_i = (ss_{ix}, ss_{iy}, 0, 1)$$

As shown in (c) in FIG. 12, the rotation angle during the corresponding hinge point transformation process is given in Table 1.

TABLE 1

| Corresponding Transformation Rotation Angle of Static Hinge Point | | | | | |
|---|---|---|---|---|---|
| Hinge point | $S_1$ | $S_2$ | $S_3$ | $S_4$ | $S_5$ | $S_6$ |
| Angle value$\theta_i$ | $\dfrac{\pi}{3} + \dfrac{\alpha}{2}$ | $\pi - \dfrac{\alpha}{2}$ | $\pi + \dfrac{\alpha}{2}$ | $\dfrac{5\pi}{3} - \dfrac{\alpha}{2}$ | $\dfrac{5\pi}{3} + \dfrac{\alpha}{2}$ | $\dfrac{\pi}{3} - \dfrac{\alpha}{2}$ |

Similarly, the homogeneous coordinates of the movable hinge joint in the movable coordinate system are obtained:

$$M_i = (mm_{ix}, mm_{iy}, 0, 1)$$

As shown in (c) in FIG. 12, the rotation angle during the corresponding hinge point transformation process is given in Table 2.

TABLE 2

| Corresponding Transformation Rotation Angle of Movable Hinge Point | | | | | |
|---|---|---|---|---|---|
| Hinge point | $M_1$ | $M_2$ | $M_3$ | $M_4$ | $M_5$ | $M_6$ |
| Angle value$\theta_i$ | $\dfrac{2\pi}{3} - \dfrac{\beta}{2}$ | $\dfrac{2\pi}{3} + \dfrac{\beta}{2}$ | $\dfrac{4\pi}{3} - \dfrac{\beta}{2}$ | $\dfrac{4\pi}{3} + \dfrac{\beta}{2}$ | $-\dfrac{\beta}{2}$ | $\dfrac{\beta}{2}$ |

It may be obtained from Equation (38) that the coordinate of the movable hinge point in the static coordinate system at this point is $$M_i^S = T\_s + m\_i \times M_i \tag{50}$$

The distance between any pair of movable and static hinge points is calculated using the distance formula between two points in a three-dimensional space:

$$l_i = \sqrt{(sm_{ix} - ss_{ix})^2 + (sm_{iy} - ss_{iy})^2 + (sm_{iz} - ss_{iz})^2} \tag{51}$$

This value is subtracted from the initial rod length, then the driving parameters of respective rods may be obtained.

The calculated N sets of driving parameters of respective rods are stored in the array L_mark_po.

The series arm and Stewart platform respectively read the parameters in the array dh_update_po and the array L_mark_po in sequence, that is, the static platform may be enabled to move to a position parallel to the movable platform in a determined trajectory in the case where the pose of the movable platform is static relative to the mechanical coordinate system. At this point, the "pose transformation stage" is completed.

In some of these embodiments, as shown in FIG. 13, performing rotation transformation on the movable platform according to an angle of twist to return the parallel platform to a zero position includes:

S1310: interpolate the angle of twist and acquire an intermediate angle of the movable platform during the rotation transformation process;

S1320: perform rotation transformation on the movable platform according to the intermediate angle and a current angle of the movable platform.

In some of these embodiments, as illustrated in FIG. 14, performing rotation transformation on the movable platform according to the intermediate angle and a current angle of the movable platform may include:

S1410: acquire an eleventh transformation matrix between the static coordinate system and the movable coordinate system according to the intermediate angle, acquire a third telescopic amount of the telescopic element according to the eleventh transformation matrix, and adjust the telescopic element according to the third telescopic amount to return the parallel platform to a zero position.

In the present embodiment, when performing the rotation transformation on the movable platform, the angle of twist may also be interpolated to obtain the intermediate angle of the movable platform during the rotation transformation process, and the eleventh transformation matrix between the static coordinate system and movable coordinate system may be obtained by using the intermediate angle, and the third telescopic amount of the telescopic element may be further obtained to return the movable platform to a zero position after adjusting the telescopic element and achieve the return of the parallel platform to a zero position.

Furthermore, the third telescopic amount may be transformed into the driving parameters of the telescopic element, and the driving adjustment is performed on the telescopic element.

In some of these embodiments, as shown in FIG. 15, the control method for reconstructing a surgical field center of an instrument also includes:

S1510: after the parallel platform returns to a zero position, acquire the coordinate of the telecentric fixed point in the static coordinate system after the reconstruction of the surgical field according to the transformation relationship between the static coordinate system and the mechanical coordinate system after the reconstruction of the surgical field, wherein the coordinate of the telecentric fixed point in the mechanical coordinate system remains unchanged.

In the present embodiment, the coordinate of the telecentric fixed point in the static coordinate system after the reconstruction of the surgical field may be reconfirmed to facilitate the confirmation of the surgical position.

Specifically, after the "pose transformation stage", the static coordinate system pose has satisfied the pose requirement after the reconstruction, there is still rotation around the Z axis of the movable coordinate system relative to the static coordinate system in the movable coordinate system of the Stewart platform, so that the series arm remains unchanged during this stage, and the Stewart platform interpolates the rotation angle around its own Z axis described previously and solves the corresponding driving parameters of Stewart.

Target is: T_s_m_rota→T_s_end_m_end. Interpolation and kinematic solution are performed on the motion of the movable platform during "a stage of returning a movable coordinate system to a zero position" as follows.

The motion during the stage is: the movable platform rotates around its own Z axis, the total angle is $\phi_z$, then, relative to the zero position state, the Euler angle description between the movable coordinate system and the static coordinate system should be $-\phi_z$ during the rotation process.

If the number of interpolation points is set to be M, then the Euler angle description eula_z of the i-th interpolation point between the movable coordinate system and the static coordinate system should be:

$$\Delta\phi_z = \frac{\phi_z}{M}, \text{eula\_z} = -(\phi_z - i\Delta\phi_z) \tag{52}$$

The transformation matrix T_s_m_rota_z_i of the i-th interpolation point between the movable coordinate system and the static coordinate system is:

$$\text{T\_s\_m\_rota\_z\_i} = \begin{bmatrix} \cos(\text{eula\_z}) & -\sin(\text{eula\_z}) & 0 & 0 \\ \sin(\text{eula\_z}) & \cos(\text{eula\_z}) & 0 & 0 \\ 0 & 0 & 1 & m_z \\ 0 & 0 & 0 & 1 \end{bmatrix} \tag{53}$$

According to the above method of ② Stewart drive solution process, T_s_m_i therein is replaced with T_s_m_rota_z_i, then the same method is used to obtain the parameters of respective driving rods in group M, and they are stored in the array L_mark_rota_z and form the drive L_mark_re_update of the Stewart platform together with L_mark_po in the entire reconstruction process.

$$\text{L\_mark\_re\_update} = [\text{L\_mark\_po}; \text{L\_mark\_rota\_z}] \tag{54}$$

The DH parameters of the series joint arm during the reconstruction process are the parameters for pose interpolation:

$$\text{dh\_re\_update} = \text{dh\_update\_po} \tag{55}$$

After the Stewart platform completes the "pose transformation stage", the array parameters in the array L_mark_rota_z are read in sequence, that is, the movable coordinate system may be enabled to rotate around its own Z axis $\phi_z$ to return the Stewart to a zero position. At this point, "a stage of returning a movable coordinate system to a zero position" is completed, that is, the entire reconstruction process of the surgical field is completed.

In addition, in order for the surgery to proceed normally, it is further necessary to re-obtain the coordinate of the telecentric fixed point in the static coordinate system and input it into the system. During the reconstruction process of the surgical field, the pose of the static platform changes, but the coordinate of the telecentric fixed point remains unchanged in the mechanical coordinate system. The coordinate of the telecentric fixed point in the static coordinate system after the reconstruction of the surgical field may be obtained according to the transformation relationship between the static coordinates and the mechanical coordinates obtained after the reconstruction of the surgical field, which is recorded as fix_new:

$$\text{fix\_new} = T\_\text{machine\_s\_end}^{-1} \times T\_\text{machine\_s\_begin} \times \text{fix} \tag{56}$$

In a specific embodiment, the control steps for reconstructing a surgical field center of an instrument are as follows:

1. Pose Transformation Stage:

①The pose transformation matrix T_machine_s_begin of the static coordinate system in the mechanical coordinate system before the reconstruction is solved through the joint information of the passive arm.

②The pose transformation matrix T_machine_s_end of the static coordinate system in the mechanical coordinate system after the reconstruction is solved according to the pose information of the movable platform in the mechanical coordinate system. Since the passive arm has 5 degrees of freedom, it is not possible to completely achieve Stewart posture return to zero through the motion of the passive arm alone, there may also be a twist in a direction of Z axis between the static coordinate system and the movable coordinate system solved here.

③Based on the pose matrix of the static coordinate system before and after the reconstruction of the surgical field, position interpolation and posture interpolation are performed on the intermediate trajectory and posture to obtain a series of pose matrices T_machine_s of the static coordinate system in the mechanical coordinate system during the intermediate process, and the motion information dh_update_po of the five joints of the passive arm between each interpolation point is solved through the inverse kinematics of the passive arm, so that the static coordinate system moves to the preset pose after the reconstruction according to the trajectory of the interpolation point.

④At the same time as step ③ proceeds, i.e., during the interpolation process, according to the pose information of the movable platform in the mechanical coordinate system and the posture matrix of interpolation pose of the static platform in the mechanical coordinate system, the transformation matrix T_s_m between the movable coordinate system and the static coordinate system of the interpolation point is obtained, and the length L_mark_po of the six drive rods of the Stewart platform is solved according to the inverse kinematics of the Stewart platform, so that the pose of the movable platform in the mechanical coordinate system remains static during the motion of the static platform.

2. Stage of Returning a Movable Coordinate System to a Zero Position:

According to the explanation in ② of the pose transformation stage, it is not possible to completely return the Stewart platform to a zero position during the pose transformation stage. there may also be a twist in a direction of Z axis between the movable coordinate system and the static coordinate system, and since it is no longer possible to return the Stewart platform to a zero position by adjusting the posture of the static platform due to the limitation of the degree of freedom of the passive arm, it is chosen to control the rotation of the movable platform around the Z axis to return the Stewart platform to a zero position. The rotation of the movable platform will cause the instrument to rotate around the Z axis, but this does not violate the telecentric fixed point principle or change the surgical field center of an instrument, which can effectively complete the reconstruction of the surgical field center.

According to the pose matrices of the movable coordinate system and the static coordinate system in the mechanical coordinate system after the pose transformation stage is completed, the angle of twist between the movable platform and the static platform is calculated, multi-point interpolation is performed on the angle, and then the length L_mark_po of six drive rods of the Stewart platform for each interpolation point is solved according to the inverse kinematics of the Stewart platform to rotate the movable platform around the Z axis at the corresponding speed until the Stewart platform returns to a zero position.

The present disclosure further provides a control method of a mechanical arm, wherein the mechanical arm includes a parallel platform which includes a movable platform, a static platform and a telescopic element connecting the movable platform and the static platform. As illustrated in FIG. 16, the method includes:

S1610: acquire a current pose of a movable platform in a mechanical coordinate system, wherein the mechanical coordinate system is a global coordinate system of the mechanical arm where the movable platform is located;

S1620: acquire, according to the current pose of the movable platform, a target pose of the static platform in the mechanical coordinate system; and S1630: perform pose transformation on the static platform according to the current pose of the movable platform and the target pose of the static platform.

As an example, the target pose of the static platform in the mechanical coordinate system may be: the center of the target pose of the static platform being located on a central axis of the current pose of the movable platform, and the static platform in the target pose being parallel to the movable platform.

As an example, the mechanical arm further includes a passive arm which is connected to the static platform. As illustrated in FIG. 17, the performing pose transformation on the static platform according to the current pose of the movable platform and the target pose of the static platform includes:

S1710: determine the driving parameter for controlling the passive arm according to the current pose of the movable platform and the target pose of the static platform; and S1720: perform pose transformation on the static platform by controlling the passive arm based on the driving parameter.

As an example, the passive arm includes a plurality of series joints. As illustrated in FIG. 18, performing pose transformation on the static platform according to the current pose of the movable platform and the target pose of the static platform includes: S1810: according to the current pose of the movable platform and the target pose of the static platform, perform pose transformation on the static platform through the passive arm, wherein when performing transformation on the posture parameters of the joints of the passive arm, the posture parameters of some joints among a plurality of series joints remain unchanged, and the pose parameters of the other joints among a plurality of series joints are changed.

As an example, the passive arm includes a first joint, a second joint, and a third joint in series, where the posture parameters of the first and third joints remain unchanged, and the third joint is connected to the static platform.

As an example, performing pose transformation on the static platform further includes: the current pose of the movable platform in the mechanical coordinate system remaining unchanged during the static platform pose transformation process.

As an example, performing pose transformation on the static platform further includes: acquiring a first telescopic amount of the telescopic element according to the current pose of the movable platform and the target pose of the static platform, and when performing pose transformation on the static platform, adjusting the telescopic element according to the first telescopic amount to make the current pose of the movable platform in the mechanical coordinate system remain unchanged.

As an example, performing pose transformation on the static platform further includes: acquiring the original pose of the static platform, interpolating the original pose and the target pose of the static platform, acquiring the intermediate pose of the static platform during the pose transformation process; and performing position transformation and posture transformation on the static platform according to the intermediate pose and the current pose of the movable platform.

As an example, the position transformation includes a circular arc motion transformation with a telecentric fixed point as the center of a circle and a linear motion transformation pointing towards the center of a circle, and the posture transformation includes rotation transformation of the static coordinate system around the Z axis of the mechanical coordinate system and rotation transformation of the static coordinate system around its own Y axis.

As an example, the pose transformation and posture transformation may be performed simultaneously.

As an example, the control method of the mechanical arm may further include: acquiring an angle of twist between the movable platform and the static platform on a central axis according to the current pose of the movable platform and the target pose of the static platform; and performing rotation transformation on the movable platform according to the angle of twist to return a parallel platform to a zero position.

As an example, the current pose of the movable platform is: a pose of the movable platform in the mechanical coordinate system after the reconstruction of the surgical field center of an instrument; and the target pose of the static platform is: a pose of the static platform in the mechanical coordinate system after the reconstruction of the surgical field center of an instrument.

The present embodiment further provides a control system for reconstructing a surgical field center of an instrument, and the system is used for implementing the above embodiment and the optional mode for carrying out the invention, in which no more details are provided for the contents that have already been explained. As used below, the term "module" and the like may implement the combination of software and/or hardware with a predetermined function. Although the system described in the following embodiments is optionally implemented in software, the implementation of hardware, or a combination of software and hardware, is also possible and envisioned.

FIG. 19 is a structural block diagram of a control system for reconstructing a surgical field center of an instrument of embodiments of the present disclosure. As illustrated in FIG. 19, the system includes:

a first acquiring module 210 for acquiring a current pose of a movable platform in a mechanical coordinate system after the reconstruction of the surgical field center of an instrument, wherein the mechanical coordinate system is a global coordinate system of a mechanical arm where the movable platform is located;

a second acquiring module 220 for acquiring, according to the current pose of the movable platform, a target pose of a static platform in the mechanical coordinate system after the reconstruction of the surgical field center of an instrument, wherein the movable platform and the static platform form a parallel platform, in the mechanical arm, connected by means of a telescopic element, the center of the target pose of the static platform is located on a central axis of the current pose of the movable platform, and the static platform in the target pose is parallel to the movable platform;

a first transformation module 230 for performing pose transformation on the static platform according to the current pose of the movable platform and the target pose of the static platform; and a second transformation module 240 for acquiring an angle of twist between the movable platform and the static platform on a central axis according to the current pose of the movable platform and the target pose of the static platform; and performing rotation transformation on the movable platform according to the angle of twist to return a parallel platform to a zero position.

In some of these embodiments, the first transformation module 230 is further used for acquiring a first transformation matrix from a static coordinate system to a movable coordinate system after the reconstruction and returning to a zero position state according to the current pose of the movable platform and the target pose of the static platform; the static coordinate system is a coordinate system where the static platform is located, and the movable coordinate system is a coordinate system where the movable platform is located; acquiring a second transformation matrix from the static coordinate system to the movable coordinate system after the reconstruction but not returning to a zero position state; and a third transformation matrix from the mechanical coordinate system to the static coordinate system before the reconstruction; acquiring a fourth transformation matrix from the mechanical coordinate system to the static coordinate system after the reconstruction according to the first, second and third transformation matrices; and acquiring a fifth transformation matrix between the joint coordinate systems of the passive arm in the mechanical arm according to the fourth transformation matrix, and performing transformation on posture parameters of the joints of the passive arm according to the fifth transformation matrix, wherein the passive arm is connected to the static platform.

In some of these embodiments, the passive arm includes a first joint, a second joint, and a third joint in series, wherein posture parameters of the first and third joints remain unchanged, and the third joint is connected to the static platform;

the first transformation matrix 230 is further used for acquiring a sixth transformation matrix from the mechanical coordinate system to the coordinate system of the first joint and a seventh transformation matrix from the coordinate system of the second joint to the coordinate system of the third joint; acquiring an eighth transformation matrix from the first joint to the second joint according to the fifth, sixth and seventh transformation matrices; and performing transformation on the posture parameter of the second joint according to the eighth transformation matrix.

In some of these embodiments, the first transformation module 230 is further used for acquiring a first telescopic amount of the telescopic element according to the current pose of the movable platform and the target pose of the static platform, and when performing pose transformation on the static platform, adjusting the telescopic element according to the first telescopic amount to make the current pose of the movable platform in the mechanical coordinate system remain unchanged.

In some of these embodiments, the first transformation module 230 is further used for acquiring the original pose of the static platform before the reconstruction, interpolating the original pose and the target pose of the static platform, acquiring the intermediate pose of the static platform during the pose transformation process; and performing position transformation and posture transformation on the static platform according to the intermediate pose and the current pose of the movable platform, wherein the position transformation includes a circular arc motion transformation with a telecentric fixed point as the center of a circle and a linear motion transformation pointing towards the center of a circle, and the posture transformation includes rotation transformation of the static coordinate system around the Z axis of the mechanical coordinate system and rotation transformation of the static coordinate system around its own Y axis.

In some of the these embodiments, the first transformation module 230 is further used for transforming the intermediate pose into the ninth transformation matrix from the static coordinate system to the mechanical coordinate system and the tenth transformation matrix from the static coordinate system to the movable coordinate system; the static coordinate system is a coordinate system where the static platform is located, and the movable coordinate system is a coordinate system where the movable platform is located; performing transformation on the posture parameter of the joint of the passive arm according to the ninth transformation matrix and the tenth transformation matrix, wherein the passive arm is connected to the static platform; acquiring a second telescopic amount of the telescopic element according to the ninth transformation matrix and the tenth transformation matrix, and adjusting the telescopic element according to the second telescopic amount to make the current pose of the movable platform in the mechanical coordinate system remain unchanged.

In some of these embodiments, the second transformation module 240 is further used for interpolating the angle of twist and acquiring an intermediate angle of the movable platform during the rotation transformation; acquiring an eleventh transformation matrix between the static coordinate system and the movable coordinate system according to the intermediate angle, acquiring a third telescopic amount of the telescopic element according to the eleventh transformation matrix, and adjusting the telescopic element according to the third telescopic amount to return the parallel platform to a zero position.

Figure 20:
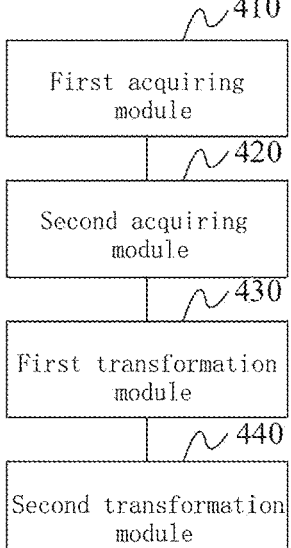
FIG. 20 is a structural block diagram of a control system of a mechanical arm according to embodiments of the present disclosure.

The embodiments of the present disclosure further provide a control system of a mechanical arm, wherein the mechanical arm includes a parallel platform which includes a movable platform, a static platform and a telescopic element connecting the movable platform and the static platform. As illustrated in FIG. 20, the system may include:

a first acquiring module 410 for acquiring a current pose of the movable platform in a mechanical coordinate system, wherein the mechanical coordinate system is a global coordinate system of the mechanical arm where the movable platform is located;

a second acquiring module 420 for acquiring, according to the current pose of the movable platform, a target pose of the static platform in the mechanical coordinate system; and a first transformation module 430 for performing pose transformation on the static platform according to the current pose of the movable platform and the target pose of the static platform.

In some of these embodiments, the mechanical arm further includes a passive arm which is connected to the static platform, wherein the first transformation module 430 is further used for: determining the driving parameter for controlling the passive arm according to the current pose of the movable platform and the target pose of the static platform; and performing pose transformation on the static platform by controlling the passive arm based on the driving parameter.

In some of these embodiments, the mechanical arm further includes a passive arm which is connected to the static platform and includes a plurality of series joints, when performing transformation on the posture parameters of the joints of the passive arm, the posture parameters of some joints among a plurality of series joints remain unchanged, and the posture parameters of the other joints among a plurality of series joints are changed.

In some of these embodiments, the passive arm includes a first joint, a second joint, and a third joint in series, wherein posture parameters of the first and third joints remain unchanged, and the third joint is connected to the static platform.

In some of these embodiments, the current pose of the movable platform in the mechanical coordinate system remains unchanged during the static platform pose transformation process.

In some of these embodiments, the first transformation module 430 is further used for: acquiring a first telescopic amount of the telescopic element according to the current pose of the movable platform and the target pose of the static platform, and when performing pose transformation on the static platform, adjusting the telescopic element according to the first telescopic amount to make the current pose of the movable platform in the mechanical coordinate system remain unchanged.

In some of these embodiments, the first transformation module 430 is further used for: acquiring the original pose of the static platform, interpolating the original pose and the target pose of the static platform, and acquiring the intermediate pose of the static platform during the pose transformation process; and performing position transformation and posture transformation on the static platform according to the intermediate pose and the current pose of the movable platform.

In some of these embodiments, the position transformation includes a circular arc motion transformation with a telecentric fixed point as the center of a circle and a linear motion transformation pointing towards the center of a circle, and the posture transformation includes rotation transformation of the static coordinate system around the Z axis of the mechanical coordinate system and rotation transformation of the static coordinate system around its own Y axis.

In some of these embodiments, the position transformation and posture transformation are performed simultaneously.

In some of these embodiments, the target pose of the static platform is: the center of the target pose of the static platform being located on a central axis of the current pose of the movable platform, and the static platform in the target pose being parallel to the movable platform.

In some of embodiments, the control system further includes: a second transformation module 440 for acquiring an angle of twist between the movable platform and the static platform on a central axis according to the current pose of the movable platform and the target pose of the static platform; and performing rotation transformation on the movable platform according to the angle of twist to return a parallel platform to a zero position.

Figure 21:
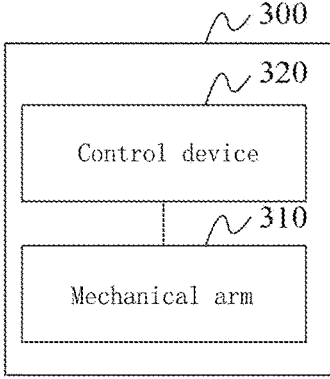
FIG. 21 is a structural block diagram of a control apparatus for reconstructing a surgical field center of an instrument according to embodiments of the present disclosure.

As illustrated in FIG. 21, the embodiments of the present disclosure provide a control apparatus 300 for reconstructing a surgical field center of an instrument which includes a mechanical arm 310 and a control device 320;

the control device 320 is used for performing pose transformation on a static platform on the mechanical arm 310, and performing rotation transformation on the movable platform on the mechanical arm 310 according to the control method for reconstructing a surgical center of an instrument in the above first aspect; or performing pose transformation on the static platform on the mechanical arm 310 according to the control method of the mechanical arm in the above second aspect.

The above control apparatus 300 for reconstructing a surgical field center of an instrument performs pose transformation on the static platform on the mechanical arm 310 through the control device 320 and performs rotation transformation on the movable platform on the mechanical arm 310, which implements returning a parallel platform to a zero position, solves the problem on difficultly achieving posture return to zero position for parallel robots existing in the related art, improves control accuracy of reconstructing a surgical field center of an instrument and ensures motion performance of a parallel platform.

Figure 22:
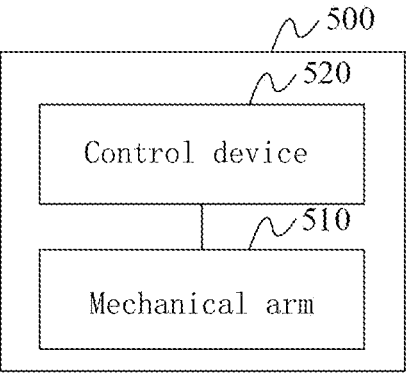
FIG. 22 is a structural block diagram of a mechanical arm assembly according to embodiments of the present disclosure.

As illustrated in FIG. 22, the embodiments of the present disclosure further provide a mechanical arm assembly 500 which includes: a mechanical arm 510; and a control device 520 for controlling the device to perform pose transformation on the static platform on the mechanical arm, and perform rotation transformation on the movable platform on the mechanical arm according to the above control method for reconstructing a surgical center of an instrument; or perform pose transformation on the static platform on the mechanical arm according to the above control method of the mechanical arm.

Figure 23:
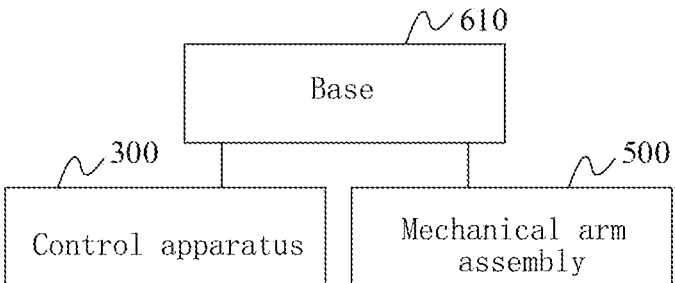
FIG. 23 is a structural block diagram of a surgical robot according to embodiments of the present disclosure.

As illustrated in FIG. 23, the embodiments of the present disclosure further provide a surgical robot which includes: a base 610; and the above control apparatus of reconstructing a surgical field center of an instrument or the above mechanical arm assembly.

The embodiments of the present disclosure further provide a readable storage medium, on which an executable program is stored and, when being executed by a processor, implements the control method for reconstructing a surgical center of an instrument as above mentioned or the control method of the mechanical arm as above mentioned.

The above readable storage medium may implement returning a parallel platform to a zero position, solve the problem on difficultly achieving posture return to zero position for parallel robots existing in the related art, improve control accuracy of reconstructing surgical field center of an instrument and ensure motion performance of a parallel platform by executing an executable program on the processor.

The embodiments of the present disclosure may further provide a computer program product which includes computer instructions, wherein the computer instructions, when being executed by a processor, implements the control method for reconstructing a surgical center of an instrument as above mentioned or the control method of the mechanical arm as above mentioned.

Compared with the related art, the control method, system and device for reconstructing a surgical field center of an instrument, and a readable storage medium, provided by the embodiments of the present disclosure acquire a current pose of a movable platform in a mechanical coordinate system after reconstruction of a surgical field center of an instrument; acquire, according to the current pose of the movable platform, a target pose of a static platform in the mechanical coordinate system after the reconstruction of the surgical field center of an instrument; perform pose transformation on the static platform according to the current pose of the movable platform and the target pose of the static platform; acquire an angle of twist between the movable platform and the static platform on a central axis according to the current pose of the movable platform and the target pose of the static platform; and perform rotation transformation on the movable platform according to the angle of twist to return a parallel platform to a zero position, which solve the problem on difficultly achieving posture return to zero for parallel robots existing in the related art, improve control accuracy of reconstructing a surgical field center of an instrument and ensure motion performance of a parallel platform.

The various technical features of the above embodiments may be combined arbitrarily. To make the description concise, not all possible combinations of respective technical features in the above embodiments have been described. However, as long as there is no contradiction in the combination of these technical features, they should be considered to be the scope of the present description.

Those ordinary skilled in the art may understand that all or partial steps in the method of the above embodiments may be completed by instructing relevant hardware through a program. The program may be stored in a readable storage medium. The program, when being carried out, includes the steps of the above method. The storage medium includes: ROM/RAM, a magnetic disc, an optical disc and the like.

The above-mentioned embodiments only express several modes for carrying out the invention of the present disclosure, and the descriptions thereof are more specific and detailed, but cannot be understood as limiting the scope of the patent application for invention. It should be pointed out that, to those ordinary skilled in the art, several modifications and improvements may also be made without departing from the concept of the present disclosure, which pertain to the protection scope of the present disclosure. Therefore, the protection scope of the present disclosure for patent shall be subject to the attached claims.

What is claimed is:

1. A control method of a mechanical arm, wherein the mechanical arm comprises a parallel platform which comprises a movable platform, a static platform and a telescopic element connecting the movable platform and the static platform, the method comprising:

acquiring a current pose of the movable platform in a mechanical coordinate system, wherein the mechanical coordinate system is a global coordinate system of the mechanical arm where the movable platform is located;

acquiring, according to the current pose of the movable platform, a target pose of the static platform in the mechanical coordinate system; and performing pose transformation on the static platform according to the current pose of the movable platform and the target pose of the static platform, wherein the performing the pose transformation on the static platform includes the current pose of the movable platform in the mechanical coordinate system remaining unchanged during the pose transformation on the static platform.

2. The method of claim 1, further comprising:

acquiring an angle of twist between the movable platform and the static platform on a central axis according to the current pose of the movable platform and the target pose of the static platform, and performing rotation transformation on the movable platform according to the angle of twist to return the parallel platform to a zero position.

3. The method of claim 2, wherein the target pose is a center of the target pose of the static platform being located on the central axis of the current pose of the movable platform, and the static platform in the target pose being parallel to the movable platform.

4. The method of claim 3, wherein the current pose of the movable platform is a pose of the movable platform in the mechanical coordinate system after a reconstruction of a surgical field center of an instrument; and the target pose of the static platform is the pose of the static platform in the mechanical coordinate system after the reconstruction of the surgical field center of the instrument.

5. The method of claim 4, wherein the performing the pose transformation on the static platform according to the current pose of the movable platform and the target pose of the static platform comprises:

acquiring a first transformation matrix from a static coordinate system to a movable coordinate system after returning to a zero position state according to the current pose of the movable platform and the target pose of the static platform; the static coordinate system being a coordinate system where the static platform is located, and the movable coordinate system being a coordinate system where the movable platform is located;

acquiring a second transformation matrix from the static coordinate system to the movable coordinate system before returning to the zero position state; and a third transformation matrix from the mechanical coordinate system to the static coordinate system before performing the pose transformation on the static platform;

acquiring a fourth transformation matrix from the mechanical coordinate system to the static coordinate system after performing the pose transformation on the static platform according to the first, second and third transformation matrices; and acquiring a fifth transformation matrix between joint coordinate systems of a passive arm in the mechanical arm according to the fourth transformation matrix, and performing transformation on driving parameters of joints of the passive arm according to the fifth transformation matrix, wherein the passive arm is connected to the static platform.

6. The method of claim 5, wherein the passive arm comprises a first joint, a second joint, and a third joint in series, wherein posture parameters of the first and third joints remain unchanged, and the third joint is connected to the static platform;

the performing the transformation on the driving parameters of the joints of the passive arm according to the fifth transformation matrix comprises:

acquiring a sixth transformation matrix from the mechanical coordinate system to a coordinate system of the first joint and a seventh transformation matrix from a coordinate system of the second joint to a coordinate system of the third joint;

acquiring an eighth transformation matrix from the first joint to the second joint according to the fifth, sixth and seventh transformation matrices; and performing the transformation on a driving parameter of the second joint according to the eighth transformation matrix.

7. The method of claim 4, wherein the performing the pose transformation on the static platform according to the current pose of the movable platform and the target pose of the static platform comprises:

acquiring an original pose of the static platform, interpolating the original pose and the target pose of the static platform, acquiring an intermediate pose of the static platform during the pose transformation; and performing position transformation and posture transformation on the static platform according to the intermediate pose and the current pose of the movable platform.

8. The method of claim 7, wherein the position transformation comprises a circular arc motion transformation with a telecentric fixed point as the center of a circle and a linear motion transformation pointing towards the center of the circle, and the posture transformation comprises the rotation transformation of a static coordinate system around a Z axis of the mechanical coordinate system and the rotation transformation of the static coordinate system around its own Y axis.

9. The method of claim 7, wherein the performing the position transformation and the posture transformation on the static platform according to the intermediate pose and the current pose of the movable platform comprises:

transforming the intermediate pose into a ninth transformation matrix from the static coordinate system to the mechanical coordinate system and a tenth transformation matrix from the static coordinate system to the movable coordinate system, the static coordinate system being a coordinate system where the static platform is located, and the movable coordinate system being a coordinate system where the movable platform is located;

performing transformation on posture parameters of joints of a passive arm according to the ninth transformation matrix and the tenth transformation matrix, wherein the passive arm is connected to the static platform; and acquiring a second telescopic amount of the telescopic element according to the ninth transformation matrix and the tenth transformation matrix, and adjusting the telescopic element according to the second telescopic amount to make the current pose of the movable platform in the mechanical coordinate system remain unchanged.

10. The method of claim 9, wherein the performing the rotation transformation on the movable platform according to the angle of twist to return the parallel platform to the zero position comprises:

interpolating the angle of twist and acquiring an intermediate angle of the movable platform during the rotation transformation; and perform the rotation transformation on the movable platform according to the intermediate angle and a current angle of the movable platform.

11. The method of claim 10, wherein the performing the rotation transformation on the movable platform according to the intermediate angle and the current angle of the movable platform comprises:

acquiring an eleventh transformation matrix between the static coordinate system and the movable coordinate system according to the intermediate angle, acquiring a third telescopic amount of the telescopic element according to the eleventh transformation matrix, and adjusting the telescopic element according to the third telescopic amount to return the parallel platform to the zero position.

12. The method of claim 11, further comprising:

after the parallel platform returns to the zero position, acquiring a coordinate of a telecentric fixed point in the static coordinate system after performing the pose transformation on the static platform according to a transformation relationship between the static coordinate system and the mechanical coordinate system after performing the pose transformation on the static platform, wherein the coordinate of the telecentric fixed point in the mechanical coordinate system remains unchanged.

13. The method of claim 7, wherein the position transformation and the posture transformation are performed simultaneously.

14. The method of claim 1, wherein the performing the pose transformation on the static platform according to the current pose of the movable platform and the target pose of the static platform comprises:

acquiring a first telescopic amount of the telescopic element according to the current pose of the movable platform and the target pose of the static platform, and when performing the pose transformation on the static platform, adjusting the telescopic element according to the first telescopic amount to make the current pose of the movable platform in the mechanical coordinate system remain unchanged.

15. The method of claim 1, wherein the mechanical arm further comprises a passive arm, the passive arm being connected to the static platform, wherein the performing the pose transformation on the static platform according to the current pose of the movable platform and the target pose of the static platform comprises:

determining a driving parameter for controlling the passive arm according to the current pose of the movable platform and the target pose of the static platform; and performing the pose transformation on the static platform by controlling the passive arm based on the driving parameter.

16. The method of claim 1, wherein the mechanical arm further comprises a passive arm, the passive arm being connected to the static platform and comprising a plurality of series joints, wherein the performing the pose transformation on the static platform according to the current pose of the movable platform and the target pose of the static platform comprises: performing the pose transformation on the static platform through the passive arm according to the current pose of the movable platform and the target pose of the static platform, wherein when performing transformation on posture parameters of the plurality of series joints of the passive arm, the posture parameters of some joints among the plurality of series joints remain unchanged, and the posture parameters of other joints among the plurality of series joints are changed.

17. The method of claim 16, wherein the passive arm comprises a first joint, a second joint, and a third joint in series, wherein the posture parameters of the first and third joints remain unchanged, and the third joint is connected to the static platform.

18. A mechanical arm assembly, wherein the mechanical arm assembly comprises:

a mechanical arm comprising a parallel platform which comprises a movable platform, a static platform and a telescopic element connecting the movable platform and the static platform; and a control device configured to perform pose transformation on the static platform on the mechanical arm according to a control method of the mechanical arm, wherein the method comprises:

acquiring a current pose of the movable platform in a mechanical coordinate system, wherein the mechanical coordinate system is a global coordinate system of the mechanical arm where the movable platform is located;

acquiring, according to the current pose of the movable platform, a target pose of the static platform in the mechanical coordinate system; and performing the pose transformation on the static platform according to the current pose of the movable platform and the target pose of the static platform, wherein the performing the pose transformation on the static platform includes the current pose of the movable platform in the mechanical coordinate system remaining unchanged during the pose transformation on the static platform.

19. A non-transitory readable storage medium, on which an executable program is stored and, when being executed by a processor, implements a control method of a mechanical arm, wherein the mechanical arm comprises a parallel platform which comprises a movable platform, a static platform and a telescopic element connecting the movable platform and the static platform, and the method comprises:

acquiring a current pose of the movable platform in a mechanical coordinate system, wherein the mechanical coordinate system is a global coordinate system of the mechanical arm where the movable platform is located;

acquiring, according to the current pose of the movable platform, a target pose of the static platform in the mechanical coordinate system; and performing pose transformation on the static platform according to the current pose of the movable platform and the target pose of the static platform, wherein the performing the pose transformation on the static platform includes the current pose of the movable platform in the mechanical coordinate system remaining unchanged during the pose transformation on the static platform.

* * * * *